US010330002B2

(12) United States Patent
Merritt et al.

(10) Patent No.: US 10,330,002 B2
(45) Date of Patent: Jun. 25, 2019

(54) TURBOCHARGER ASSEMBLY

(71) Applicant: Garrett Transportation I Inc., Torrance, CA (US)

(72) Inventors: Shawn W Merritt, Redondo Beach, CA (US); Luca Tabacchi, Redondo Beach, CA (US); Neil Lino, Torrance, CA (US)

(73) Assignee: Garrett Transportation I Inc., Torrance, CA (US)

(*) Notice: Subject to any disclaimer, the term of this patent is extended or adjusted under 35 U.S.C. 154(b) by 65 days.

(21) Appl. No.: 15/375,693

(22) Filed: Dec. 12, 2016

(65) Prior Publication Data

US 2018/0163617 A1 Jun. 14, 2018

(51) Int. Cl.

| | |
|---|---|
| ***F02B 39/14*** | (2006.01) |
| ***F02C 6/12*** | (2006.01) |
| ***F01D 25/16*** | (2006.01) |
| ***F01D 11/00*** | (2006.01) |
| ***F02B 37/10*** | (2006.01) |
| ***F04D 29/056*** | (2006.01) |
| ***F04D 29/059*** | (2006.01) |
| ***F02C 7/06*** | (2006.01) |

(52) U.S. Cl.

CPC ............ *F02B 39/14* (2013.01); *F01D 11/005* (2013.01); *F01D 25/162* (2013.01); *F02B 37/10* (2013.01); *F02C 6/12* (2013.01); *F02C 7/06* (2013.01); *F04D 29/059* (2013.01); *F04D 29/0563* (2013.01); *F05D 2220/40* (2013.01); *F05D 2240/50* (2013.01); *F05D 2260/36* (2013.01); *Y02T 10/144* (2013.01)

(58) Field of Classification Search

CPC ................................ F02B 39/14; F02B 37/10
USPC .......... 60/605.1, 605.2, 605.3; 415/110–113, 415/229–231
See application file for complete search history.

(56) References Cited

U.S. PATENT DOCUMENTS

| | | | | |
|---|---|---|---|---|
| 1,680,672 | A | 8/1928 | Fawick | |
| 6,845,617 | B1 | 1/2005 | Allen | |
| 7,036,991 | B2 | 5/2006 | Belpanno | |
| 8,454,242 | B2 * | 6/2013 | Mavrosakis | F01D 25/16 384/462 |
| 9,261,105 | B2 | 2/2016 | Schmidt | |
| 2002/0155009 | A1 | 10/2002 | Panos | |

(Continued)

FOREIGN PATENT DOCUMENTS

| | | | |
|---|---|---|---|
| DE | 10 2012 223001 | A1 | 6/2014 |
| JP | 2006 009685 | A | 1/2006 |

(Continued)

OTHER PUBLICATIONS

EP Application No. 17204824.1-1006 /3333371, Extended European Search Report dated May 23, 2018 (12 pages).

(Continued)

*Primary Examiner* — Hoang M Nguyen
(74) *Attorney, Agent, or Firm* — Brian J. Pangrle

(57) ABSTRACT

A system can include a housing that includes a bore having a longitudinal axis; a cartridge disposed in the bore where the cartridge includes a recess; a bearing assembly disposed in the cartridge where the bearing assembly includes an outer race and rolling elements; and a locating plate attached to the housing where the locating plate includes an extension that is received by the recess of the cartridge.

15 Claims, 16 Drawing Sheets

(56) References Cited

U.S. PATENT DOCUMENTS

| | | | | |
|---|---|---|---|---|
| 2004/0200215 | A1 | 10/2004 | Meyer | |
| 2010/0247342 | A1* | 9/2010 | Shimizu | F01D 15/10 417/410.1 |
| 2010/0284824 | A1 | 11/2010 | Hippen | |
| 2012/0177314 | A1* | 7/2012 | Mavrosakis | F01D 25/16 384/474 |
| 2013/0239568 | A1 | 9/2013 | Krishnan | |
| 2013/0309072 | A1* | 11/2013 | Marsal | F01D 25/162 415/170.1 |
| 2014/0193239 | A1* | 7/2014 | Ramasamy | F01D 25/186 415/111 |
| 2016/0010492 | A1 | 1/2016 | Cavagnaro | |

FOREIGN PATENT DOCUMENTS

| | | | |
|---|---|---|---|
| JP | 2011 153569 | A | 8/2011 |
| WO | 2006 112372 | A1 | 10/2006 |
| WO | 2013 112424 | A1 | 8/2013 |
| WO | 2014 177848 | A1 | 11/2014 |

OTHER PUBLICATIONS

EP Application No. 17205041.1-1006 / 3333363, Extended European Search Report dated May 23, 2018 (7 pages).
EP Application No. 17205042.9-1006 /3333364, Extended European Search Report dated May 23, 2018 (9 pages).
EP Application No. 17205038.7-1006 /3333362, Extended European Search Report dated May 23, 2018 (9 pages).

* cited by examiner

TURBOCHARGER ASSEMBLY

TECHNICAL FIELD

Subject matter disclosed herein relates generally to shaft assemblies for compressor wheels and for turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. An electric compressor can include one or more compressor wheels that are connected to a shaft or shafts that can be driven by an electric motor. As an example, a shaft that is attached to one or more bladed wheels may be supported by one or more bearings disposed in a bearing housing, which may form a center housing rotating assembly (CHRA). During operation of a turbocharger or an electric compressor, depending on factors such as size of various components, a shaft may be expected to rotate at speeds in excess of 200,000 rpm. To ensure proper rotordynamic performance, a rotating group should be well balanced and well supported over a wide range of conditions (e.g., operational, temperature, pressure, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
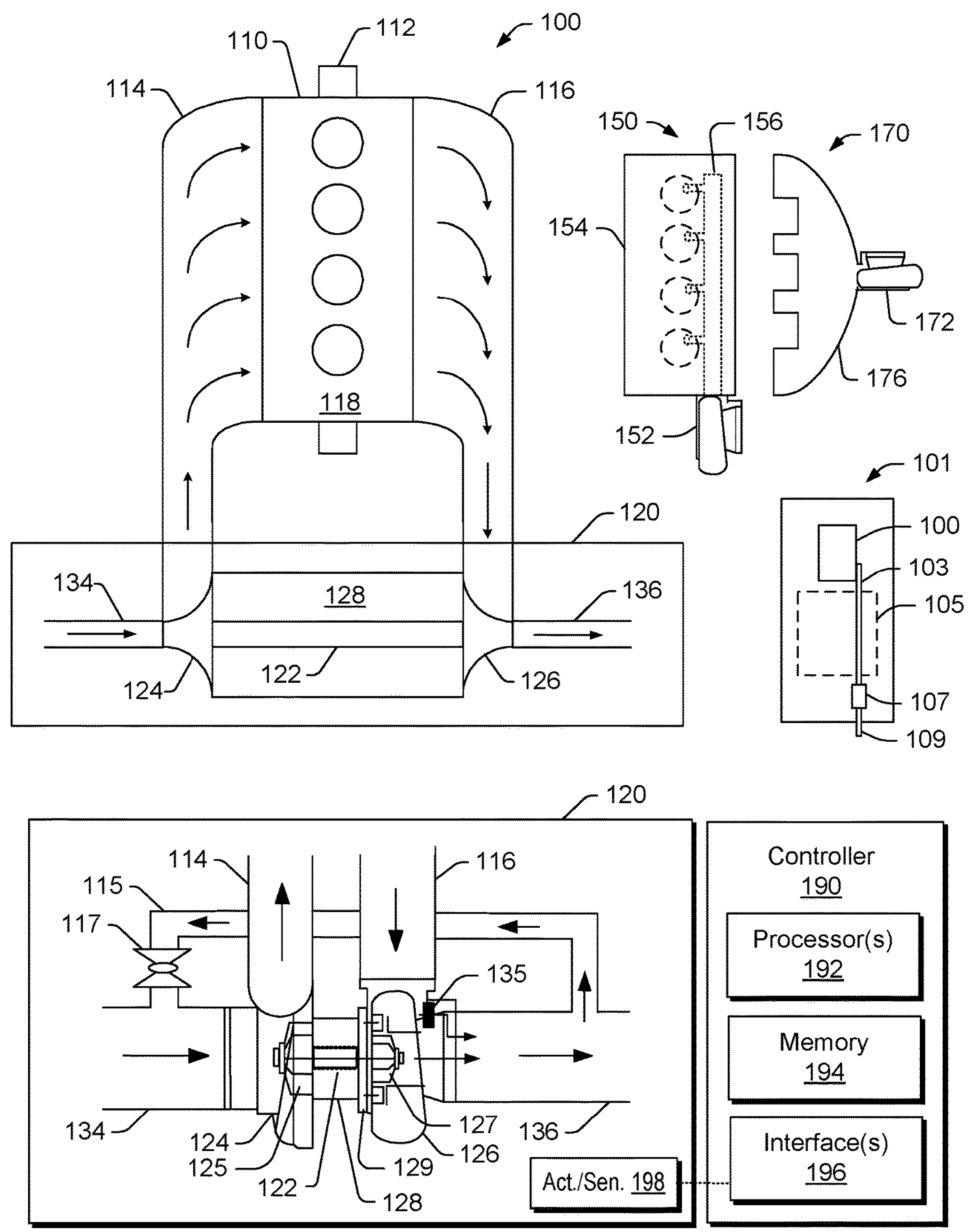
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
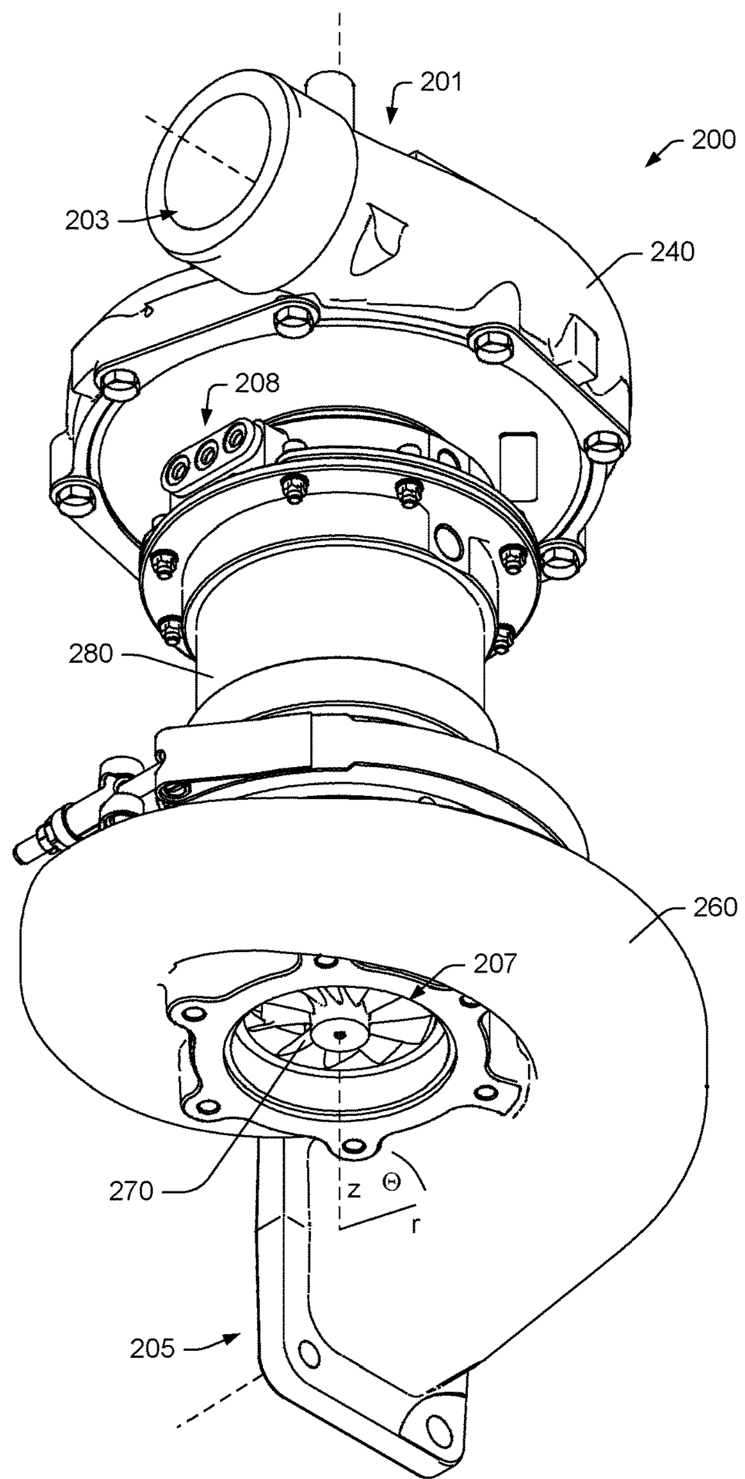
FIG. 2 is a perspective view of an example of a system that includes wheels and a shaft.

FIG. 2 shows an example of a turbocharger system 200 that includes a compressor assembly 240, a turbine assembly 260 that includes a turbine wheel 270 and a center housing 280 that is disposed between the compressor assembly 240 and the turbine assembly 260. In the example of FIG. 2, the center housing 280 can be an electric motor housing. In the example of FIG. 2, a compressor inlet 201 and a compressor outlet 203 are shown as well as a turbine inlet 205 and a turbine outlet 207. Further, an electric motor can be a three phase electric motor where a three phase connector 208 can be utilized to electrically connect the electric motor to a three phase power supply, which may be controlled via three phase electric motor control circuitry, which may be part of a computerized control system of a vehicle (e.g., an engine control unit, etc.). As an example, power may be supplied via one or more sources. As an example, a source can be a stored power source (e.g., one or more batteries) or a source can be a generator or alternator source that may be driven by an internal combustion engine (e.g., an engine that can produce exhaust gas that can be directed to the turbine inlet 205).

Figure 3:
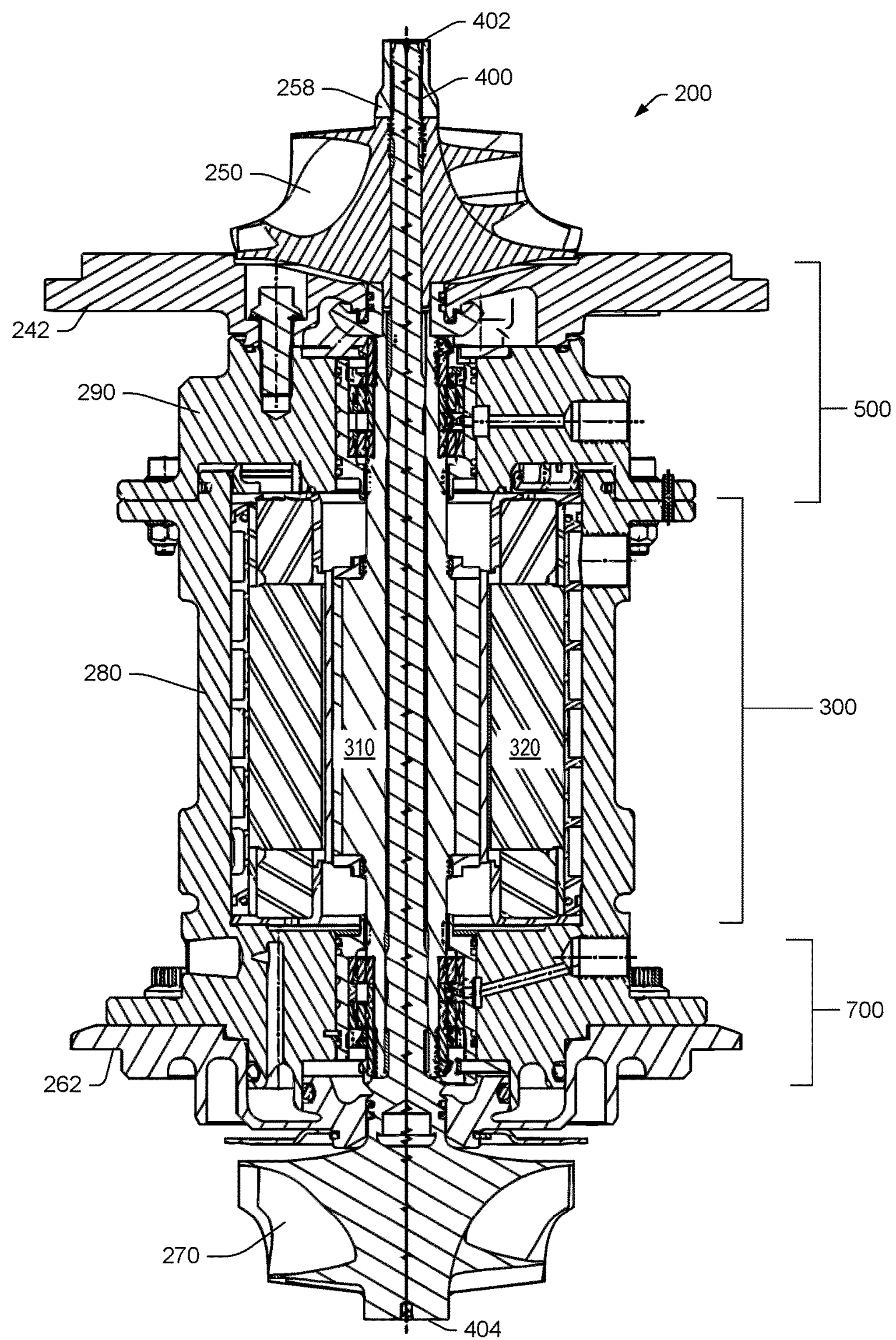
FIG. 3 is a cross-sectional view of a portion of the system of FIG. 2.

FIG. 3 shows a cross-sectional view of a portion of the system 200 where the system 200 includes an electric motor assembly 300, a shaft 400, a compressor side bearing assembly 500 and a turbine side bearing assembly 700. FIG. 3 also shows a compressor wheel 250 operatively coupled to the shaft 400, a nut 258 operatively coupled to the shaft 400 at or proximate to a compressor end 402 of the shaft 400, a compressor side plate 242 (e.g., a backplate), a turbine side plate 262, the turbine wheel 270 that defines a turbine end 404 of the shaft 400 (e.g., as a shaft and turbine wheel assembly (SWA)), a compressor side cartridge housing 290, an electric motor rotor 310 and an electric motor stator 320.

As an example, an electric motor assembly may include a rotor that is a moving component of an electromagnetic portion that functions as an electric motor, an electric generator and/or an electric alternator. Rotation of a rotor can be due to interaction between windings and magnetic fields that produce a torque around a rotor's longitudinal, rotational axis. As an example, the system 200 can optionally operate as an electric generator and/or as an electric alternator. As an example, exhaust gas may be utilized to generate electricity. As an example, the electric motor assembly 300 may optionally be utilized to apply force to a rotor that may act to resist rotation of the rotor. As an example, such an approach may act to limit boost provided by a compressor wheel. As an example, a system may be a supercharger system that includes an electric motor and a compressor wheel.

In the example of FIG. 3, electrical power may be supplied to the electric motor assembly 300 such that the electric motor rotor 310 rotates about an axis of the shaft 400 with respect to the electric motor stator 320. In such an example, rotation of the shaft 400 can rotate the compressor wheel 250, which may be utilized to compress air, optionally air mixed with fuel and/or exhaust.

Figure 4:
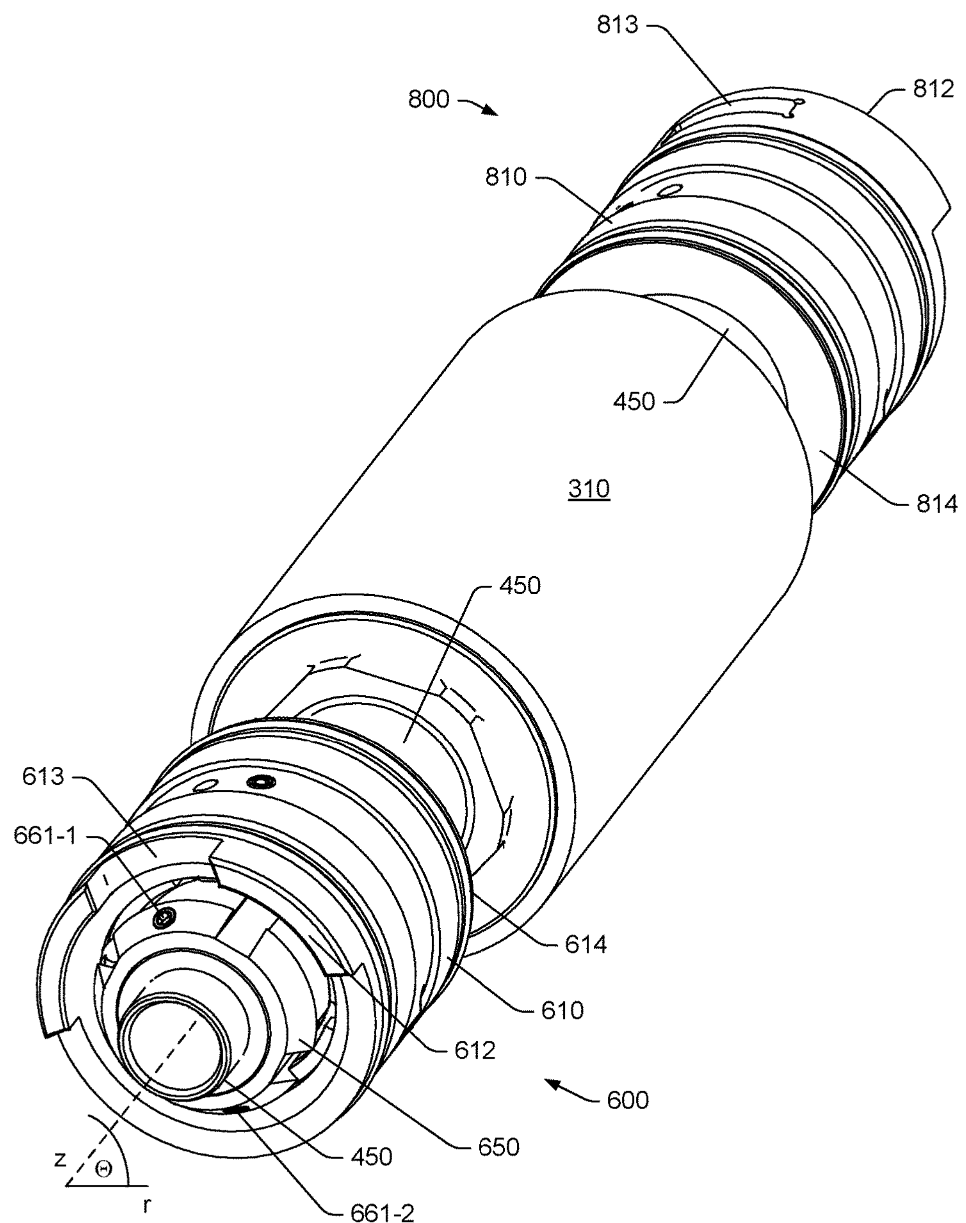
FIG. 4 is a perspective view of an example of an assembly of the system of FIG. 2.

FIG. 4 shows a perspective view of a portion of the system 200 that includes the electric motor rotor 310, a compressor side bearing cartridge 610 and a turbine side bearing cartridge 810. As shown, a sleeve 450 extends from a compressor side to the turbine side. The cartridge 610 includes opposing ends 612 and 614 where a recess 613 can be utilized to azimuthally locate and/or limit rotation of the cartridge 610 and the cartridge 810 includes opposing ends 812 and 814 where a recess 813 can be utilized to azimuthally locate and/or limit rotation of the cartridge 810.

In the example of FIG. 4, the recess 613 is open to one side whereas the recess 813 is closed. In such an example, the recess 813 may act to axially locate and/or limit axial movement of the cartridge 810 and, for example, one or more other components that may be operatively coupled to the cartridge 810.

In the example of FIG. 4, a lock nut 650 is threaded onto the sleeve 450 via mating of internal threads of the lock nut 650 (e.g., ID threads) and external threads of the sleeve 450 (e.g., OD threads). The lock nut 650 can be secured via one or more set screws 661-1 and 661-2. For example, the lock nut 650 can be threaded onto the sleeve 450 to a desired position and/or a desired torque and then at least one of the set screws 661-1 and 661-2 can be rotated about its axis to contact the sleeve 450 with force sufficient to prevent rotation of the lock nut 650 with respect to the sleeve 450. As an example, the lock nut 650 can include features that allow for interaction with a tool that can rotate the lock nut 650. As an example, such features may be axial slots that may also be passages that can allow for flow of lubricant (e.g., from a bearing assembly toward a thrust collar).

Figure 5:
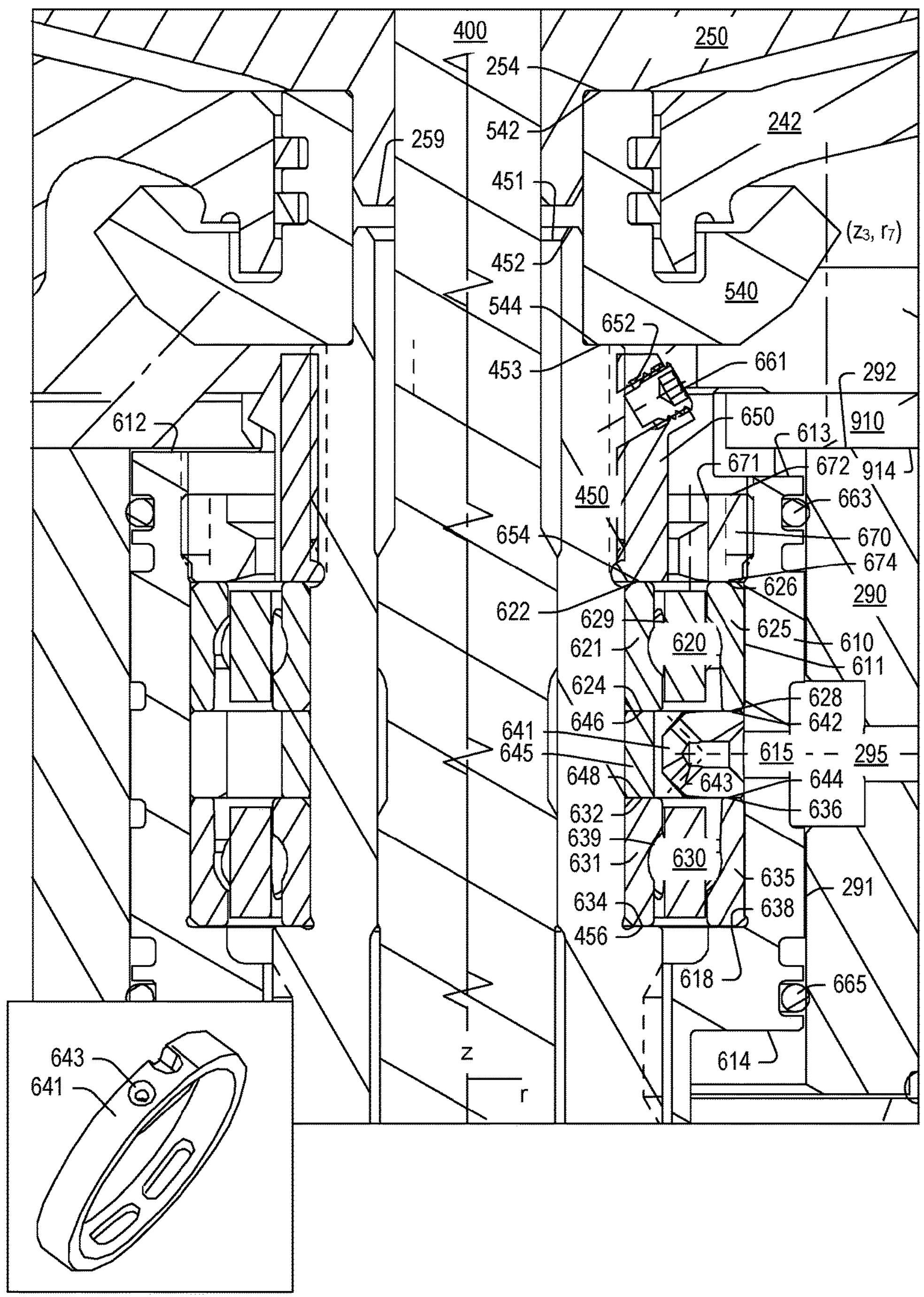
FIG. 5 is a cross-sectional view of a portion of the system of FIG. 2.

FIG. 5 shows a cross-sectional view of a portion of the system 200 where various compressor side components can be seen. In FIG. 5, the compressor wheel 250 is mounted onto the shaft 400 where a thrust collar 540 is disposed at least in part axially between the compressor wheel 250 and at least a portion of the sleeve 450. In such an example, the compressor wheel 250 can be secured onto the shaft 400 via tightening of the nut 258 (e.g., a shaft nut) such that an axial load is carried by the thrust collar 540 and the sleeve 450. As shown, the axial load is not carried by the lock nut 650, which is threaded onto the sleeve 450.

More particularly, in the example of FIG. 5, an axial face surface 254 of the compressor wheel 250 contacts an axial face surface 542 of the thrust collar 540 and an opposing axial face surface 544 of the thrust collar 540 contacts an axial face surface 453 of the sleeve 450. As show, an axial clearance (e.g., an axial gap) exists between the thrust collar 540 and an axial face surface 652 of the lock nut 650. In the example of FIG. 5, an axial clearance (e.g., an axial gap) also exists between an end 259 of the compressor wheel 250 and an end 452 of the sleeve 450. Thus, in such an example, the compressor wheel 250 does not directly contact the sleeve 450, rather the compressor wheel 250 contacts the thrust collar 540, which contacts the sleeve 450.

As shown, the plate 242 includes a bore and the thrust collar 540 is disposed at least in part in the bore where, for example, seal members such as piston rings, may be set in annular grooves of the thrust collar 540 to hinder flow of fluid from a compressor side to a center housing side of the plate 242 and/or vice versa. In the example of FIG. 5, the compressor wheel 250 rotates with the shaft 400, the sleeve 450, the thrust collar 540 and the lock nut 650.

FIG. 5 shows the cartridge 610 as being set in a bore 291 of the compressor side cartridge housing 290 where, for example, one or more seal members 663 and 665 (e.g., O-rings, which may be elastomeric) may be received in one or more annular grooves to form a seal between an outer surface of the cartridge 610 and an inner surface of the bore 291 of the compressor side cartridge housing 290. As shown, the cartridge 610 includes opposing ends 612 and 614, noting that a portion of the cartridge 610 extends axially inwardly from the end 614 (see, e.g., cross-section view of FIG. 3).

FIG. 5 also shows a locating plate 910 that includes a surface 914 that abuts an end surface 292 of the compressor side cartridge housing 290. As an example, the locating plate 910 can be bolted or otherwise secured to the compressor side cartridge housing 290. In such an example, a portion of the locating plate 910 is received by the recess 613 of the cartridge 610 such that rotation of the cartridge 610 is limited (e.g., azimuthal locating). In such an example, some radial movement of the cartridge 610 in the bore 291 may occur, for example, via an extent allowable by the seal members 663 and 665 (e.g., elastomeric O-rings). As an example, such seal members may define a lubricant space between the cartridge 610 and the compressor side cartridge housing 290 such that one or more lubricant squeeze films are formed. Such films may act to damp vibrations and/or to transfer heat energy (e.g., via flow of lubricant).

As shown in FIG. 5, the cartridge 610 includes a bore 611 that receives various bearing components, including components of a first bearing assembly 620 and components of a second bearing assembly 630. As shown, the bearing assembly 620 includes an inner race 621, an outer race 625 and rolling elements 629 disposed between the inner race 621 and the outer race 625. As shown, the bearing assembly 630 includes an inner race 631, an outer race 635 and rolling elements 639 disposed between the inner race 631 and the outer race 635.

Components disposed between the first bearing assembly 620 and the second bearing assembly 630 can include an outer ring 641 and an inner ring 645 where the outer ring 641 includes one or more lubricant passages 643. FIG. 5 shows an example of the outer ring 641 as including a lubricant passage 643 as an inlet lubricant passage (e.g., lubricant opening) and as including one or more lower lubricant passages (e.g., lubricant openings). The outer ring 641 also shows a notch that can receive a locating pin, which may limit rotation of the outer ring 641 about the z-axis (e.g., to assure proper alignment of lubricant features). The cartridge 610 can include one or more passages 615 that can be in fluid communication with one or more passages 295 of the compressor side cartridge housing 290 such that lubricant can be fed to the first bearing assembly 620 and the second bearing assembly 630 (e.g., via the outer ring 641).

In the example of FIG. 5, the lock nut 650 may be considered to be an inner lock nut that axially locates and/or axially loads the inner races 621 and 631 with the inner ring 645 therebetween. In the example of FIG. 5, an outer lock nut 670 includes a bore 671 and outer threads that mate with inner threads of the bore 611 of the cartridge 610. The outer lock nut 670 may be used to axially locate and/or to axially load the outer races 625 and 635 with the outer ring 641 therebetween. As shown, the cartridge 610 includes an axial face surface 618 within the bore 611 where a surface 638 of the outer race 635 can abut the axial face surface 618, which may be an axial stop surface that axially locates the outer race 635.

As to axial stacking, the surface 638 of the outer race 635 abuts the axial face surface 618 of the cartridge 610, a surface 644 of the outer ring 641 abuts a surface 636 of the outer race 635, a surface 628 of the outer race 625 abuts a surface 642 of the outer ring 641 and a surface 674 of the outer lock nut 670 abuts a surface 626 of the outer race 625.

As an example, the lock nut 650 may be adjusted to an axial position, optionally according to an amount of torque, to axially locate and/or to axially load the inner races 621 and 631 and the inner ring 645 where the inner race 631 includes a surface 634 that abuts an axial face surface 456 of the sleeve 450 (e.g., an annular shoulder of the sleeve 450).

As to axial stacking, the surface 634 of the inner race 631 abuts the axial face surface 457 of the sleeve 450, a surface 648 of the inner ring 645 abuts a surface 632 of the inner race 631, a surface 624 of the inner race 621 abuts a surface 646 of the inner ring 645 and the surface 654 of the lock nut 650 abuts a surface 622 of the inner race 621.

In the example of FIG. 5, the sleeve 450, the lock nut 650, the inner race 621, the inner ring 645 and the inner race 631 rotate with the shaft 400 and the compressor wheel 250.

In the example of FIG. 5, the inner races 621 and 631 and the inner ring 645 can be independent of a load applied to the compressor wheel 250 and the thrust collar 540. In such an example, where an inner race may be relatively thin or otherwise deformable under an applied load, as may be transferred from a tightened compressor wheel, the inner race is not subjected to such an applied load. Such an approach can allow for utilization of a type of bearing assembly that is independent of load applied axially to a compressor wheel (e.g., load applied by the compressor wheel 250 to the thrust collar 540 and to the shaft sleeve 450).

As an example, a set of angular contact ball bearing assemblies can be configured in one or more types of configurations. For example, consider an O-type configuration, an X-type configuration and a T-type configuration. As an example, bearing assemblies may be installed in pairs and configured according to how their outer races are oriented. For example, consider a back to back configuration known as an O-type configuration, a face to face configuration known as an X-type configuration, and a series configuration known as a T-configuration or T-type configuration. In FIG. 5, the bearing assemblies 620 and 630 are shown in an X-type configuration where the outer ring 641 is disposed axially between the outer race 625 and the outer race 635, which have radially thicker portions that extend to the surfaces 626 and 638, respectively. In such an example, the contact angle for the bearing assembly 620 is oriented from the ball 629 toward the surface 626 and the contact angle for the bearing assembly 630 is oriented from the ball 639 toward the surface 638; thus, lines drawn along these two contact angles form an "X" pattern.

As an example, bearing assemblies may be oriented in an O-type configuration. For example, the bearing assemblies 620 and 630 may be oriented in a back to back configuration with the inner ring 645 disposed between the inner races 621 and 631. In such an example, the radially thicker portions of the inner races 621 and 631 at surfaces 624 and 632 may bear a load, which may be applied by tightening the lock nut 650 on the shaft sleeve 450 (e.g., to a desired torque, etc.).

In the example of FIG. 5, the lock nut 650 is adjusted to be in an axial position that allows the lock nut 650 to axially limit movement of the inner races 621 and 631 and the inner ring 645. The lock nut 650 can be adjusted via rotation as threads having a thread pitch can cause rotation of the lock nut 650 with respect to threads having a thread pitch of the shaft sleeve 450 to translate the lock nut 650 axially. The lock nut 650 can hold the inner races 621 and 631 and the inner ring 645 to prevent axial displacement of the bearing assemblies 620 and 630. In an X-type configuration, the outer lock nut 670 may be rotated via mated threads to translate the outer lock nut 670 axially away from the thrust collar 540 such that a load may be applied to the outer races 625 and 635 and the outer ring 643.

As explained above, the bearing assemblies 620 and 630, the lock nut 650 and the outer lock nut 670 may be in one or more configurations where a lock nut can axially locate and/or apply an axial load. In such examples, such an axial load can be independent of an axial load associated with tightening a compressor wheel. In the example of FIG. 5, the inner races 621 and 631 and the inner ring 643 are secured to rotate with the sleeve 450 and the outer races 625 and 635 and the outer ring 641 are secured to the cartridge 610, which remains relatively stationary with respect to the sleeve 450. As an example, an assembly may include one or more springs that can be axially positioned to apply a load to a portion of a bearing assembly or portions of bearing assemblies.

Figure 6:
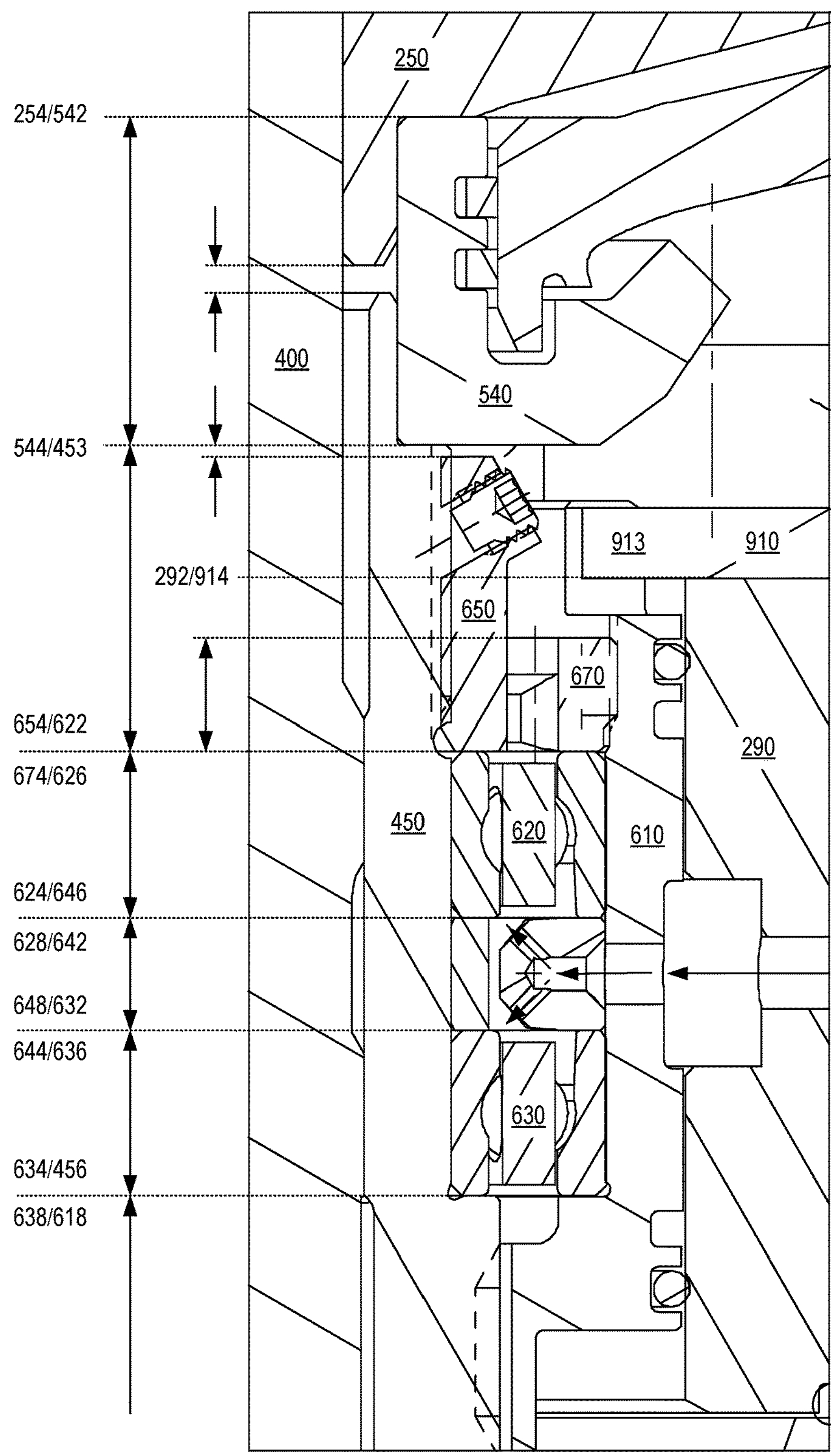
FIG. 6 is a cross-sectional view of a portion of the system of FIG. 2.

FIG. 6 shows a cross-sectional view of a portion of the system 200 where various axial dimensions are indicated with respect to surfaces, particularly axial facing surfaces. Such surfaces include various paired surfaces that can be in contact and contribute to axial stack-up as to various components.

As shown in FIG. 6, the thrust collar 540 can be defined by an axial length, the lock nut 650 can be defined by an axial length, the outer lock nut 670 can be defined by an axial length, the first bearing assembly 620 can be defined by an axial length or axial lengths, the outer ring 641 can be defined by an axial length, the inner ring 645 can be defined by an axial length, the second bearing assembly 630 can be defined by an axial length or axial lengths, etc.

As shown in FIG. 6, an axial clearance exists between the compressor wheel 250 and the sleeve 450 and an axial clearance exists between the thrust collar 540 and the lock nut 650.

As shown in FIG. 6, the axial length of the lock nut 650 can be greater than the axial length of the outer lock nut 670 such that the lock nut 650 extends axially closer to the thrust collar 540 and such that an extension 913 of the locating plate 910 can extend radially inwardly to a radial position that is less than an outer radius of the outer lock nut 670.

As shown in FIG. 6, the locating plate 910 can be in contact with the compressor side cartridge housing 290, for example, by being attached to the compressor side cartridge housing 290 (e.g., via one or more bolts, etc.). As mentioned, the locating plate 910 can be an anti-rotation component that can limit rotation of the cartridge 610 about the rotational axis of the shaft 400. In such an example, the outer races 625 and 635 and the outer ring 641, as well as the outer lock nut 670, can be limited in their rotation via contact with an inner surface of the bore 611 of the cartridge 610 while the inner races 621 and 631 and the inner ring 645, along with the lock nut 650, rotate with the shaft 400 and the sleeve 450 (e.g., and the thrust collar 540).

FIG. 6 also shows arrows as to lubricant flow through the compressor side cartridge housing 290, through the cartridge 610 and into the passages 643 of the outer ring 641 such that the first bearing assembly 620 and the second bearing assembly 630 can be lubricated (e.g., for lubricant and heat removal). As shown in FIG. 6, the bore 671 of the outer lock nut 670 defines a clearance with respect to the lock nut 650 such that lubricant may flow from spaces associated with the first bearing assembly 620 and the second bearing assembly 630 to a space that is in fluid communication with a drain (e.g., a lubricant outlet) that can be, for example, a cross-bore, etc. in the compressor side cartridge housing 290 (see, e.g., FIG. 2).

Figure 7:
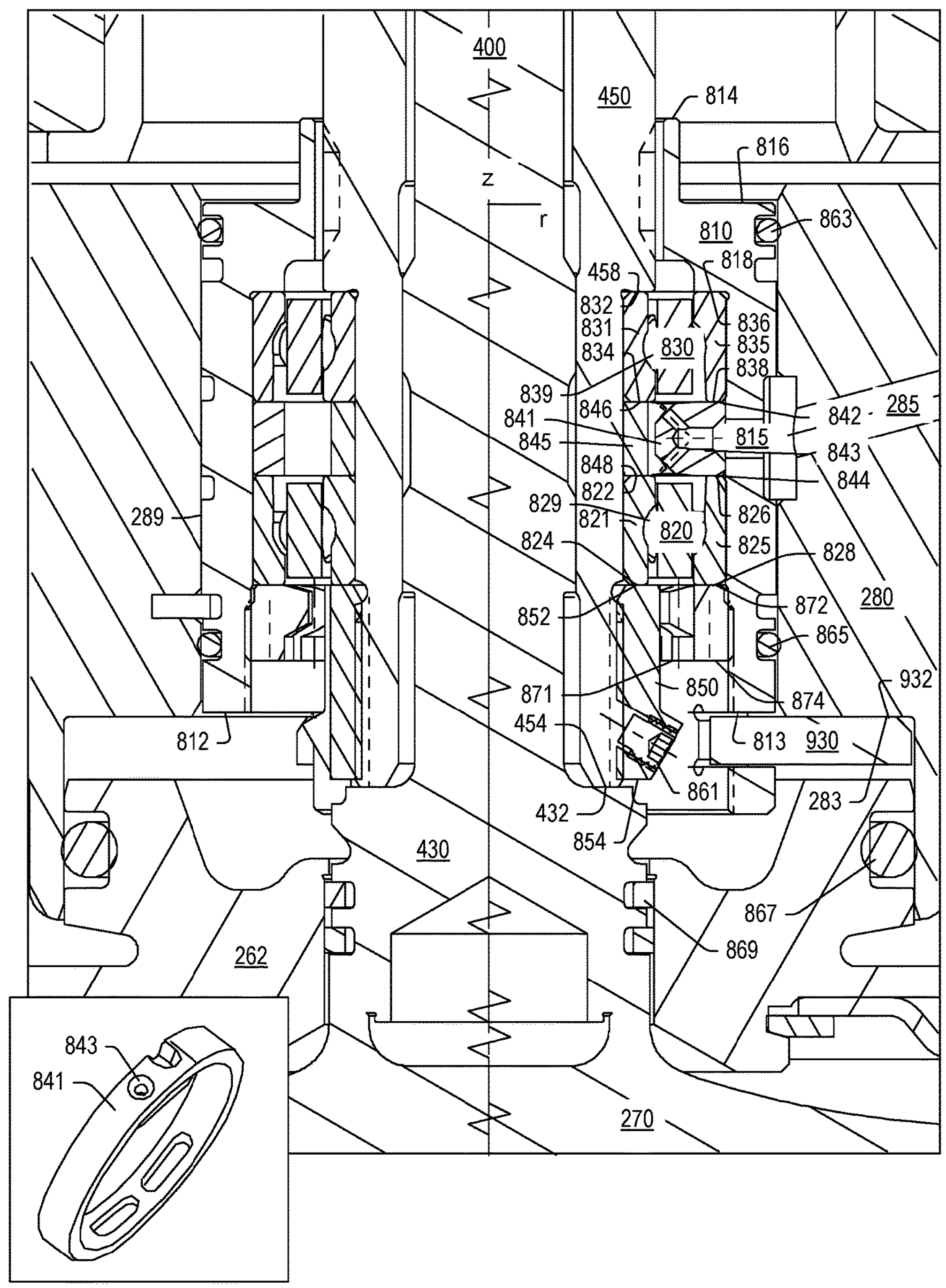
FIG. 7 is a cross-sectional view of a portion of the system of FIG. 2.

FIG. 7 shows a cross-sectional view of a portion of the system 200 where various turbine side components can be seen. In FIG. 7, the turbine wheel 270 is connected to a hub portion 430 of the shaft 400 to form a shaft and wheel assembly (SWA). As an example, the turbine wheel 270 can be welded to the hub portion 430 of the shaft 400. As shown, the hub portion 430 of the shaft 400 includes annular grooves that can receive one or more seal members 869 such as, for example, one or more piston rings. The turbine side plate 262 includes a bore through which the shaft 400 can be inserted such that the one or more seal members 869 can contact a bore surface to hinder flow of fluid from a turbine side to a bearing side or vice versa. For example, lubricant flow may be hindered from the bearing side to the turbine side and exhaust flow may be hindered from the turbine side to the bearing side. As shown in FIG. 7, the turbine side plate 262 includes an annular groove that can receive a seal member 867 such as, for example, an O-ring that can form a seal with a surface of the center housing 280.

As shown in FIG. 7, the sleeve 450 includes an axial face surface 454 that seats against an axial face surface 432 of the hub portion 430 of the shaft 400. In such an example, the sleeve 450 is axially supported by the shaft 400 such that force applied to the compressor wheel 250, for example, via tightening of the nut 258 on the shaft 400, applies force to the thrust collar 540, which applies force to the sleeve 450.

In the example of FIG. 7, inner races 821 and 831 of a first bearing assembly 820 and a second bearing assembly 830, respectively, and an inner ring 845 can be independent of a load applied to the compressor wheel 250 and the thrust collar 540, which can be transferred via the shaft sleeve 450 to the axial face surface 432 of the hub portion 430 of the shaft 400. In such an example, where an inner race may be relatively thin or otherwise deformable under an applied load, as may be transferred from a tightened compressor wheel, the inner race is not subjected to such an applied load. Such an approach can allow for utilization of a type of bearing assembly that is independent of load applied axially to a compressor wheel (e.g., load applied by the compressor wheel 250 to the thrust collar 540 and to the shaft sleeve 450).

As mentioned, a set of angular contact ball bearing assemblies can be configured in one or more types of configurations. For example, consider an 0-type configuration, an X-type configuration and a T-type configuration. As mentioned, bearing assemblies may be installed in pairs and configured according to how their outer races are oriented (e.g., a back to back configuration known as an 0-type configuration, a face to face configuration known as an X-type configuration, and a series configuration known as a T-configuration or T-type configuration). In FIG. 7, the bearing assemblies 820 and 830 are shown in an X-type configuration where the outer ring 841 is disposed axially between an outer race 825 of the bearing assembly 820 and an outer race 835 of the bearing assembly 830, which have radially thicker portions that extend to surfaces 828 and 836, respectively. In such an example, the contact angle for the bearing assembly 820 is oriented from a ball 829 (e.g., rolling element) toward the surface 828 and the contact angle for the bearing assembly 830 is oriented from a ball 839 (e.g., rolling element) toward the surface 836; thus, lines drawn along these two contact angles form an “X” pattern.

As an example, bearing assemblies may be oriented in an O-type configuration. For example, the bearing assemblies 820 and 830 may be oriented in a back to back configuration with the inner ring 845 disposed between the inner races 821 and 831. In such an example, the radially thicker portions of the inner races 821 and 831 at surfaces 822 and 834 may bear a load, which may be applied by tightening the lock nut 850 on the shaft sleeve 450 (e.g., to a desired torque, etc.).

In the example of FIG. 7, the lock nut 850 is adjusted to be in an axial position that allows the lock nut 850 to axially limit movement of the inner races 821 and 831 and the inner ring 845. The lock nut 850 can be adjusted via rotation as threads having a thread pitch can cause rotation of the lock nut 850 with respect to threads having a thread pitch of the shaft sleeve 450 to translate the lock nut 850 axially. The lock nut 850 can hold the inner races 821 and 831 and the inner ring 845 to prevent axial displacement of the bearing assemblies 820 and 830. In an X-type configuration, the outer lock nut 870 may be rotated via mated threads to translate the outer lock nut 870 axially away from the hub portion 430 such that a load may be applied to the outer races 825 and 835 and the outer ring 843.

As explained above, the bearing assemblies 820 and 830, the lock nut 850 and the outer lock nut 870 may be in one or more configurations where a lock nut can axially locate and/or apply an axial load. In such examples, such an axial load can be independent of an axial load associated with tightening a compressor wheel. As an example, an assembly may include one or more springs that can be axially positioned to apply a load to a portion of a bearing assembly or portions of bearing assemblies.

As shown in FIG. 7, at the turbine side, the first bearing assembly 820 and the second bearing assembly 830 also include the inner races 821 and 831, respectively, which are seated with respect to the shaft sleeve 450 and axially located via the lock nut 850. As shown in FIG. 7, an axial clearance (e.g., an axial gap) exists between the lock nut 850 and the hub portion 430 of the shaft 400. Specifically, the axial clearance exists between a surface 854 of the lock nut 850 and the hub portion 430 of the shaft 400 (e.g., the surface 432).

In the example of FIG. 7, the lock nut 850 is threaded onto the sleeve 450 via mating of internal threads of the lock nut 850 (e.g., ID threads) and external threads of the sleeve 450 (e.g., OD threads). The lock nut 850 can be secured via a set screw 861 or set screws. For example, the lock nut 850 can be threaded onto the sleeve 450 to a desired position and/or a desired torque and then the set screw 861 can be rotated about its axis to contact the sleeve 450 with force sufficient to prevent rotation of the lock nut 850 with respect to the sleeve 450.

As an example, a system can include one or more compressor side bearing assemblies that are loaded by a compressor side lock nut and one or more turbine side bearing assemblies that are loaded by turbine side lock nut. In such a system, the bearing assemblies can be loaded against a sleeve where inner races of the bearing assemblies rotate with the sleeve. Further, the sleeve can include a stop surface that can seat a compressor side thrust collar and, for example, a shaft can include a stop surface that can seat the sleeve. A sleeve can carry a compressor wheel load and can carry one or more independent loads as associated with one or more bearing assemblies. A compressor wheel load may be a compressive as applied to a sleeve and tensile as applied to a shaft. A bearing assembly load can be compressive as applied to a bearing assembly and can be tensile as applied to a sleeve.

FIG. 7 shows the cartridge 810 as being set in a bore 289 of the housing 280 where, for example, one or more seal members 863 and 865 (e.g., O-rings, which may be elastomeric) may be received in one or more annular grooves to form a seal between an outer surface of the cartridge 810 and an inner surface of the bore 289 of the compressor side cartridge housing 290. As shown, the cartridge 810 includes opposing ends 812 and 816, noting that a portion of the cartridge 810 extends axially inwardly from the end 816 (see, e.g., cross-section view of FIG. 3) to an end 814. In such an example, some radial movement of the cartridge 810 in the bore 289 may occur, for example, via an extent allowable by the seal members 863 and 865 (e.g., elastomeric O-rings). As an example, such seal members may define a lubricant space between the cartridge 810 and the housing 280 such that one or more lubricant squeeze films are formed. Such films may act to damp vibrations and/or to transfer heat energy (e.g., via flow of lubricant).

FIG. 7 also shows a locating plate 930 that includes a surface 932 that abuts an end surface 283 of the housing 280. As an example, the locating plate 930 can be bolted or otherwise secured to the housing 280. In such an example, an extension 933 of the locating plate 930 is received by the recess 813 of the cartridge 810 such that rotation of the cartridge 810 is limited azimuthally (e.g., azimuthal locating) and such that the cartridge 810 is limited axially (e.g., axial locating).

As shown in FIG. 7, the cartridge 810 includes a bore 811 that receives various bearing components, including components of the first bearing assembly 820 and components of the second bearing assembly 830. As shown, the bearing assembly 820 includes the inner race 821, an outer race 825 and rolling elements 829 disposed between the inner race 821 and the outer race 825. As shown, the bearing assembly 830 includes the inner race 831, an outer race 835 and rolling elements 839 disposed between the inner race 831 and the outer race 835.

Components disposed between the first bearing assembly 820 and the second bearing assembly 830 include the outer ring 841 and the inner ring 845 where the outer ring 841 includes one or more lubricant passages 843. FIG. 7 shows an example of the outer ring 841 as including a lubricant passage 843 as an inlet lubricant passage (e.g., lubricant opening) and as including one or more lower lubricant passages (e.g., lubricant openings). The outer ring 841 also shows a notch that can receive a locating pin, which may limit rotation of the outer ring 841 about the z-axis. The cartridge 810 can include one or more passages 815 that can be in fluid communication with one or more passages 285 of the housing 280 such that lubricant can be fed to the first bearing assembly 820 and the second bearing assembly 830.

In the example of FIG. 7, the lock nut 850 may be considered to be an inner lock nut that can axially locate and/or axially load the inner races 821 and 831 with the inner ring 845 therebetween. In the example of FIG. 7, the outer lock nut 870 includes a bore 871 and includes outer threads that mate with inner threads of the bore 811 of the cartridge 810. The outer lock nut 870 may be used to axially locate and/or axially load the outer races 825 and 835 with the outer ring 841 therebetween. As shown, the cartridge 810 includes an axial face surface 818 within the bore 811 where a surface 836 of the outer race 835 can abut the axial face surface 818, which may be an axial stop surface that axially locates the outer race 835.

As to axial stacking, the surface 836 of the outer race 835 abuts the axial face surface 818 of the cartridge 810, a surface 842 of the outer ring 841 abuts the surface 838 of the outer race 835, the surface 826 of the outer race 825 abuts a surface 844 of the outer ring 841 and a surface 872 of the outer lock nut 870 abuts a surface 828 of the outer race 825.

As mentioned, the lock nut 850 may be adjusted to axially locate and/or axially load the inner races 821 and 831 and the inner ring 845 where the inner race 831 includes the surface 832 that abuts an axial face surface 458 of the sleeve 450.

As to axial stacking, the surface 832 of the inner race 831 abuts the axial face surface 458 of the sleeve 450, a surface 846 of the inner ring 845 abuts the surface 834 of the inner race 831, the surface 822 of the inner race 821 abuts a surface 848 of the inner ring 845 and the surface 852 of the lock nut 850 abuts a surface 824 of the inner race 821.

In the example of FIG. 7, the sleeve 450, the lock nut 850, the inner race 821, the inner ring 845 and the inner race 831 rotate with the shaft 400 and the turbine wheel 270.

In the example of FIG. 7, a load applied to bearing assemblies 820 and 830 and the inner ring 845 and/or the outer ring 841 can be independent of a load applied to the sleeve 450 via tightening of the nut 258 on the shaft 400 to secure the compressor wheel 250.

Figure 8:
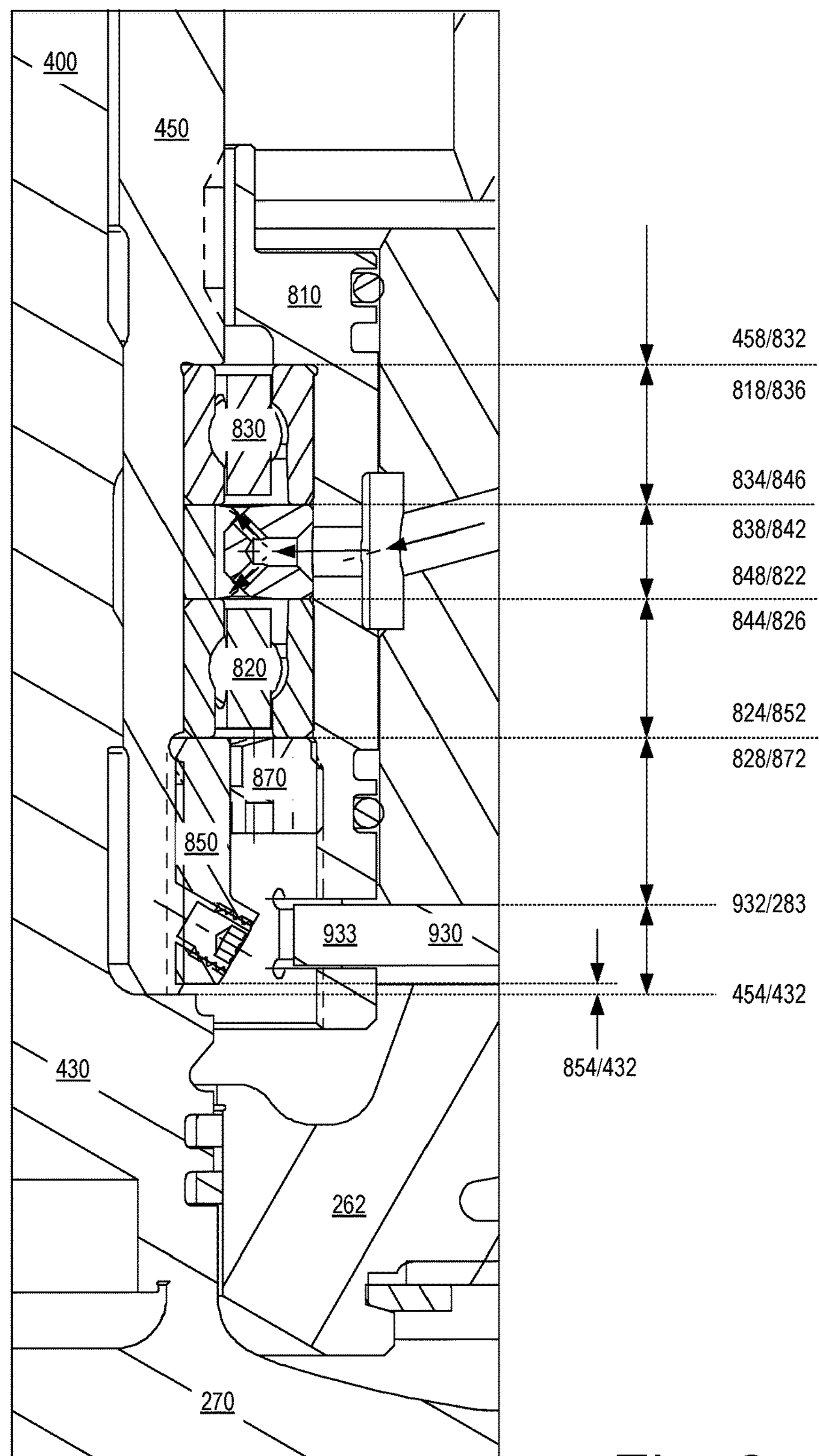
FIG. 8 is a cross-sectional view of a portion of the system of FIG. 2.

FIG. 8 shows a cross-sectional view of a portion of the system 200 where various axial dimensions are indicated with respect to surfaces, particularly axial facing surfaces.

As shown in FIG. 8, the lock nut 850 can be defined by an axial length, the outer lock nut 870 can be defined by an axial length, the first bearing assembly 820 can be defined by an axial length or axial lengths, the outer ring 841 can be defined by an axial length, the inner ring 845 can be defined by an axial length, the second bearing assembly 830 can be defined by an axial length or axial lengths, etc.

As shown in FIG. 8, an axial clearance exists between the hub portion 430 of the shaft 400 and the lock nut 850.

As shown in FIG. 8, the axial length of the lock nut 850 can be greater than the axial length of the outer lock nut 870 such that the lock nut 850 extends axially closer to the hub portion 430 of the shaft 400 and such that an extension 933 of the locating plate 930 can extend radially inwardly to a radial position that is less than an outer radius of the outer lock nut 870.

As shown in FIG. 8, the locating plate 930 can be in contact with the housing 280, for example, by being attached to the housing 280 (e.g., via one or more bolts, etc.). As mentioned, the locating plate 930 can be an anti-rotation component that can limit rotation of the cartridge 810 about the rotational axis of the shaft 400 and/or can be an anti-translation component that can limit axial translation of the cartridge 810. In such an approach, the outer races 825 and 835 and the outer ring 841, as well as the outer lock nut 870, can be limited in their rotation via contact with an inner surface of the bore 811 of the cartridge 810 while the inner races 821 and 831 and the inner ring 845, along with the lock nut 850, rotate with the shaft 400 and the sleeve 450.

As an example, the extension 933 of the locating plate 930 may be inserted into the recess 813 of the cartridge 810 and then the cartridge 810 may be drawn into the bore 289 of the housing 280 and the locating plate 930 fixed to the housing 280 (e.g., via one or more bolts, etc.). At the compressor side of the system 200, the locating plate 910 can be attached such that its extension 913 aligns with the recess 613 of the cartridge 610. As shown in FIG. 3, the recess 613 can be open at one side such that the locating plate 910 can be positioned with its extension 913 aligned with the recess 613 of the cartridge 610. One or more bolts (e.g., or other attachment components, etc.) may be utilized to fix the locating plate 910 to the compressor side cartridge housing 290, which can be fixed to the housing 280. In such an example, the cartridge 610 is located at least in part by the locating plate 910 and the cartridge 810 is located at least in part by the locating plate 930. As an example, the locating plate 930 can axially locate the cartridge 810 and thereby limit its axial movement in either of two opposing axial directions.

FIG. 8 also shows arrows as to lubricant flow through the housing 280, through the cartridge 810 and into the passages 843 of the outer ring 841 such that the first bearing assembly 820 and the second bearing assembly 830 can be lubricated (e.g., for lubricant and heat removal). As shown in FIG. 8, the bore 871 of the outer lock nut 870 defines a clearance with respect to the lock nut 850 such that lubricant may flow from spaces associated with the first bearing assembly 820 and the second bearing assembly 830 to a space that is in fluid communication with a drain (e.g., a lubricant outlet) that can be, for example, a cross-bore, etc. in the housing 280 (see, e.g., FIG. 2).

Figure 9:
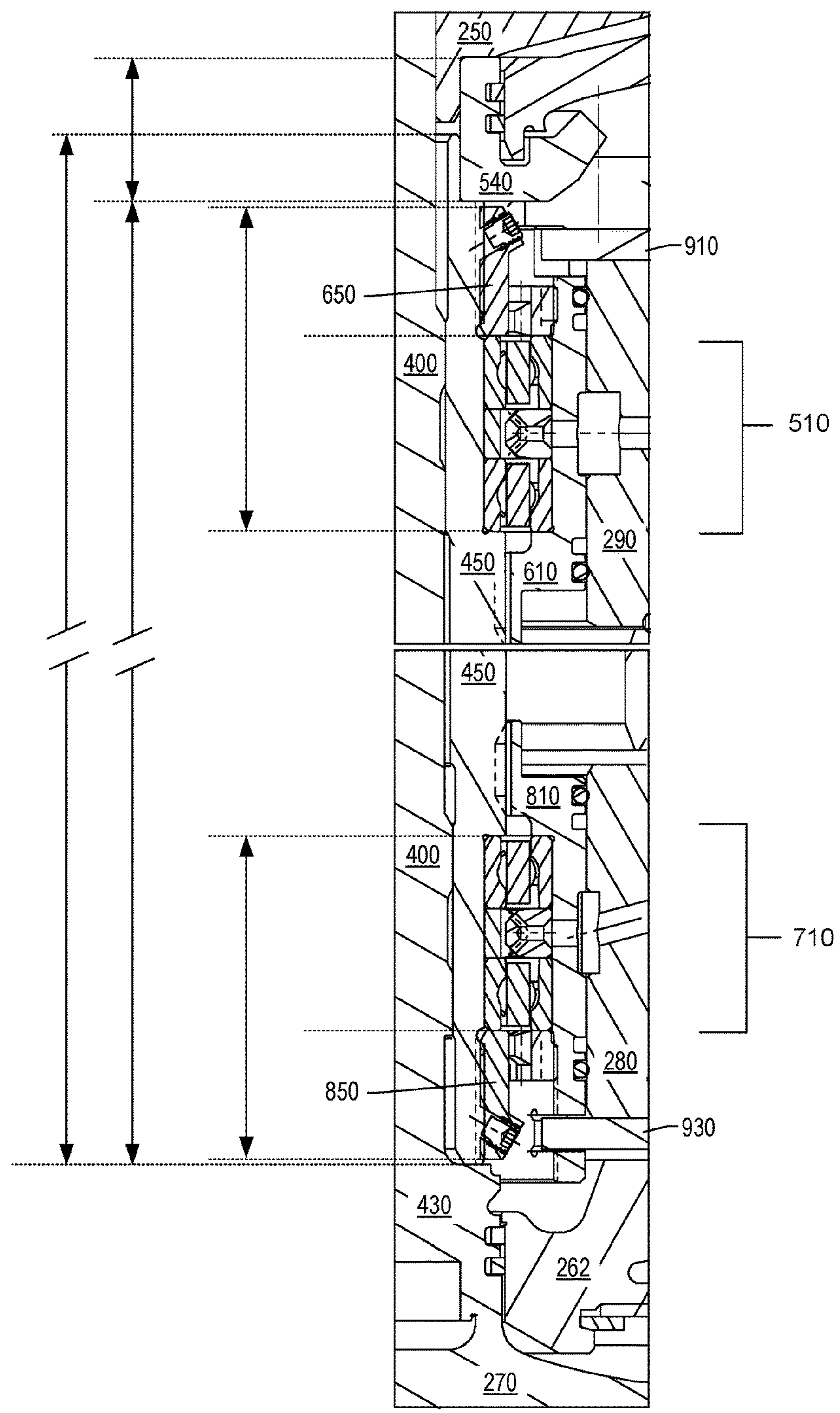
FIG. 9 is a cross-sectional view of portions of the system of FIG. 2.

FIG. 9 shows various components of the system 200 of FIG. 2 where a compressor side bearing assembly 510 is loaded onto the sleeve 450 by torque applied to the lock nut 650 and where a turbine side bearing assembly 710 is loaded onto the sleeve by torque applied to the lock nut 850. As shown, the compressor wheel 250 applies a load on the sleeve 450 via the thrust collar 540. As shown, the cartridge 610 is located by a locating plate 910 and the cartridge 810 is located by a locating plate 930.

In the example of FIG. 9, the sleeve 450 and bearing assemblies 510 and 710 may be considered to be a sub-assembly, along with the lock nuts 650 and 850, which act to locate and load the bearing assemblies 510 and 710, respectively, while the sleeve 450 can bear a load against the hub portion 430 of the shaft 400 as applied by the thrust collar 540 and the compressor wheel 250 being in contact with the thrust collar 540 where the nut 258 or other mechanism may be utilized to load the compressor wheel 250 with respect to the shaft 400 and the sleeve 450.

In the example of FIG. 9, the sleeve 450 can be a single piece formed of a metal or metal alloy that extends an axial length between opposing ends 452 and 454 where the end 452 is a free end and where the end 454 is in contact with the hub portion 430 of the shaft 400. As shown, the shaft 400 is received by the bore 451 of the sleeve 450 where one or more pilot portions of the shaft 400 can be in contact with a surface of the sleeve 450 that defines the bore 451. The bore 451 may include one or more diameters, one or more features, etc. For example, the bore 451 can be a stepped bore. Such a stepped bore can include one or more larger diameter portions at and/or near an end or ends and can include a smaller diameter portion over a length that is intermediate the larger diameter portions.

Figure 10:
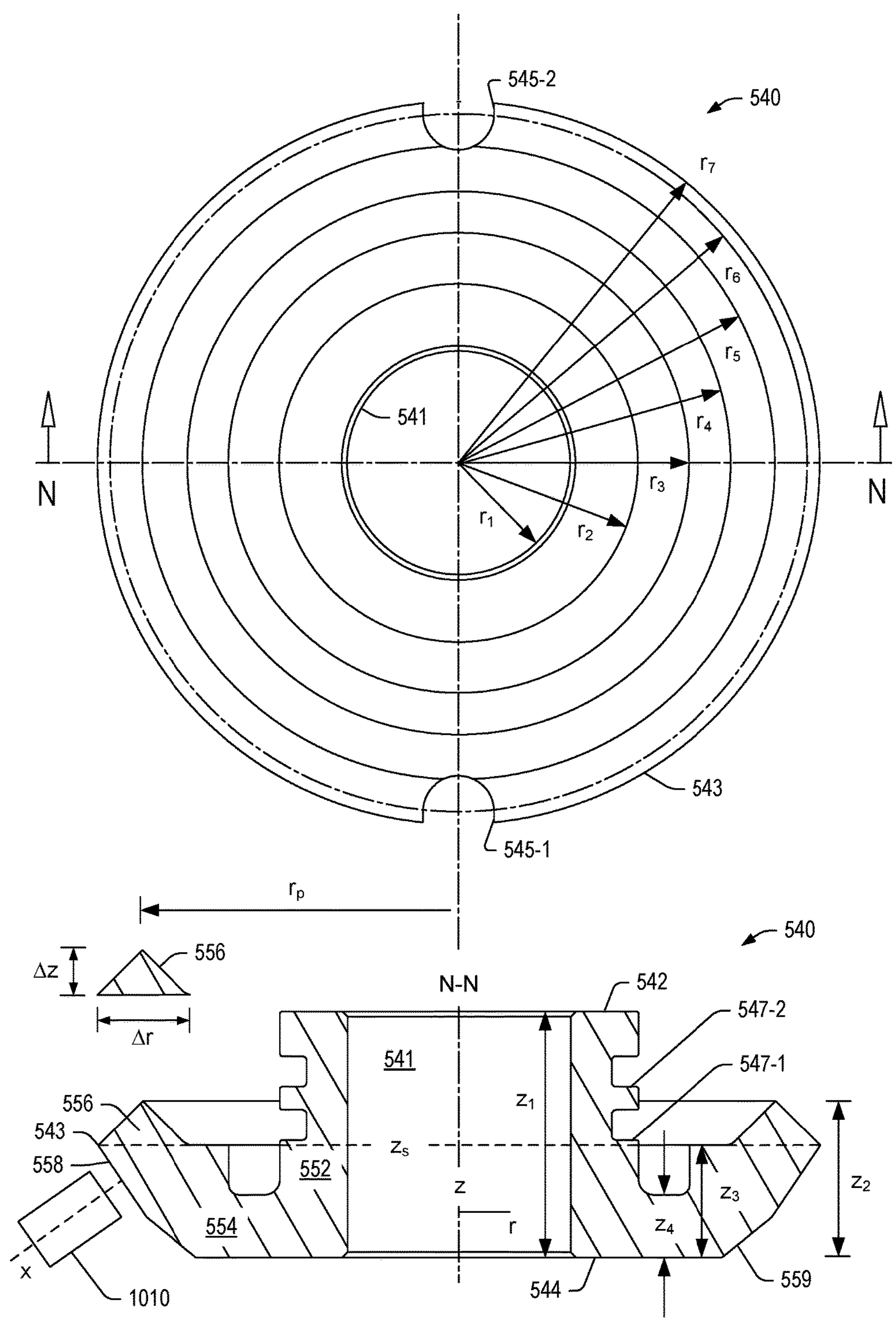
FIG. 10 is a series of views of an example of a thrust collar.

FIG. 10 shows a plan view of the thrust collar 540 and a cross-sectional view of the thrust collar 540 along a line N-N. In FIG. 10, the thrust collar 540 is shown as including a through bore 541 that extends between ends 542 and 544. The thrust collar 540 also includes an outer perimeter 543 (e.g., at a maximum diameter or maximum radius), which includes notches 545-1 and 545-2 that are disposed at about 180 degrees from each other in azimuthal angle about a longitudinal axis of the thrust collar 540 where such notches can be speed monitoring features. For example, a speed sensor 1010 can detect the notches 545-1 and 545-2 where sensed information may be used to determine rotational speed of the shaft 400. As an example, a thrust collar can include one or more notches. Where a thrust collar includes a plurality of notches, they may be located at angles that aim to balance the thrust collar where removal of material from a sacrificial portion can be utilized to balance an assembly that is a rotating assembly that includes the thrust collar.

In the example of FIG. 10, the thrust collar 540 includes a stem portion 552 and a cap portion 554 where the cap portion 554 includes a sacrificial portion 556, which can have, as an example, a substantially triangular cross-section, which may be an acute triangle (three angles acute, less than 90 degrees) or an obtuse triangle (one obtuse angle, greater than 90 degrees and two acute angles). As an example, a largest interior angle of a triangular shape may be a peak angle or free angle (e.g., at a free peak of a sacrificial portion).

As shown, the cap portion 554 also includes a sensor surface 558, which is disposed at an angle to the longitudinal axis (z-axis) of the thrust collar 540. As shown in FIG. 10, the sacrificial portion 556 is formed as an integral portion of the thrust collar 540. As an example, the thrust collar 540 may be formed at least in part by machining stock metallic material (e.g., metal or metal alloy). The sacrificial portion 556 may be formed and shaped in a manner that does not introduce an amount of stress that may give rise to failure of the thrust collar 540 as it rotates, which may be at speeds of tens of thousands revolutions per minute, which may exceed 100,000 rpm.

The sacrificial portion 556 of the thrust collar 540 can be a substantially continuous annular portion, which may be interrupted by continuations of the notches 545-1 and 545-2. For example, each of the notches 545-1 and 545-2 may span an azimuthal angle of about 10 degrees such that the sacrificial portion 556 includes two spans each of about an azimuthal angle of about 175 degrees. As an example, a thrust collar may include a number of equally spaced sacrificial portions where material may be removed from one or more of the sacrificial portions as part of a balancing process. In such an example, removal of the material may impart or form balance cuts. As shown in FIG. 10, the sacrificial portion 556 is disposed at or near an outermost perimeter of the thrust collar 540 such that a mass of material removed may impart a substantial effect on balance. The sacrificial portion 556 is positioned as to reduce structural effect on the stem portion 552, which can bear a load associated with tightening of a compressor wheel.

In FIG. 10, various axial dimensions and radial dimensions of the thrust collar 540 are shown. In cross-section, the thrust collar 540 has a J-shape (e.g., a body of revolution formed by a J-shape which may be rotated 360 degrees) or a hat shape (e.g., a mushroom shape).

FIG. 10 shows a series of increasing radii $r_1$, $r_2$, $r_3$, $r_4$, $r_5$, $r_6$ and $r_7$. The sacrificial portion 556 can be disposed between radii $r_4$ and $r_7$ (see, e.g., $\Delta r$ as a base dimension of the sacrificial portion 556) where a peak radius, $r_p$, may correspond to the radius $r_5$. As an example, the radius $r_6$ may correspond to a sensor radius of the sensor surface 558. FIG. 10 also shows axial dimensions $z_1$, $z_2$, $z_3$ and $z_4$ where the sacrificial portion 556 can be of an axial dimension $\Delta z$, which can be equal to a difference between $z_2$ and $z_3$. As shown in FIG. 10, the stem portion 552 has an axial length $z_1$ and a radius $r_2$ with a bore 541 having a bore radius $r_1$ while the cap portion 554 has axial lengths of $z_4$, $z_3$ and $z_2$ over radii from $r_2$ to $r_7$. The notches 545-1 and 545-2 are shown of having a radial depth of about a difference between radii $r_5$ and $r_7$.

In the example of FIG. 10, the thrust collar 540 includes a r,Θ-plane defined in a cylindrical coordinate system (r, z, Θ) where the r,Θ-plane is at an axial position labeled $z_s$, which demarcates the sacrificial portion 556 of the cap portion 554. As shown, the sacrificial portion 556 extends in an axial direction away from the r,Θ-plane toward the end 542 of the thrust collar 540, which is in an axial direction toward the compressor wheel 250 in the system 200. Specifically, in the example of FIG. 10, the sacrificial portion 566 of the thrust collar 540 can be positioned as practically close as possible toward the compressor end of the shaft 400 for the purpose of having a greater effect on balancing of a rotating group. As an example, a sacrificial portion can be positioned to avoid "confusing" a speed sensor (e.g., to avoid interference with a speed sensor's ability to sense speed).

As an example, the speed sensor 1010 can be pointed at the sensor surface 558 that is substantially perpendicular to an axis of the speed sensor 1010 (x-axis). When a metallic material is in proximity to the tip of the speed sensor 1010, a charge can build up. The notches 545-1 and 545-2 in the metallic material of the thrust collar 540 can pass the tip of the speed sensor 1010 and release at least a portion of the built up charge and circuitry operatively coupled to the speed sensor 1010 or part of the speed sensor 1010 can thereby detect a rotation of the thrust collar 540, for example, for calculating the speed of a rotating group. As to a balance cut, if a cut were made on the outer diameter (e.g., outer perimeter), the speed sensor 1010 may possibly incorrectly read the cut as a notch and increase the count.

FIG. 10 shows a cross-sectional view of the sacrificial portion 556 as defined in part by the radial dimension $\Delta r$, the axial dimension $\Delta z$ and the peak radius $r_p$. Material of the sacrificial portion 556 may be removed at least in part to balance a rotating group where removal of such material does not interfere with the notches 545-1 and 545-2 and the speed sensor 1010 being able to sense speed of the thrust collar 540 as it rotates (e.g., to count full or fractional rotations).

The sacrificial portion 556 can include a sufficient amount of material to allow for balancing of a rotating group of a turbocharger such as shown in the system 200 of FIG. 2. As an example, a balancing process or balancing processes may include cutting the compressor wheel 250 and/or the nut 258 and/or the thrust collar 540.

As shown in the example of FIG. 10, the thrust collar 540 includes annular grooves 547-1 and 547-2 that can receive seal elements such as, for example, piston rings, which as mentioned may contact the backplate 242, which can be attached to the compressor side cartridge housing 290 (see, e.g., FIG. 3).

Referring to FIG. 5, the thrust collar 540 may come into contact with lubricant that exits an annular space between the lock nut 650 and the cartridge 610 and/or the outer lock nut 670. During operation, such lubricant may be driven radially outwardly along the end 544 of the thrust collar 540 and then along a surface 559 intermediate the end 544 and the sensor surface 558. As the lubricant moves radially outwardly, it may be flung off of the thrust collar 540 and into a space defined in part by the compressor side bearing cartridge housing 290 and the backplate 242. Such an arrangement of components may hinder migration of lubricant along the stem portion 552 of the thrust collar 540 and toward the compressor wheel 250. As an example, the perimeter 543 of the thrust collar 540 may form an outermost limit for migration of lubricant where lubricant is flung radially outwardly therefrom. As shown in FIG. 10, the axial dimension $z_3$ corresponds to the radius $r_7$, which can be seen, for example, in FIG. 5 as ($z_3$, $r_7$). As seen in FIG. 5, the sacrificial portion 556 can help reduce migration of lubricant between the backplate 242 and the thrust collar 540.

Figure 11:
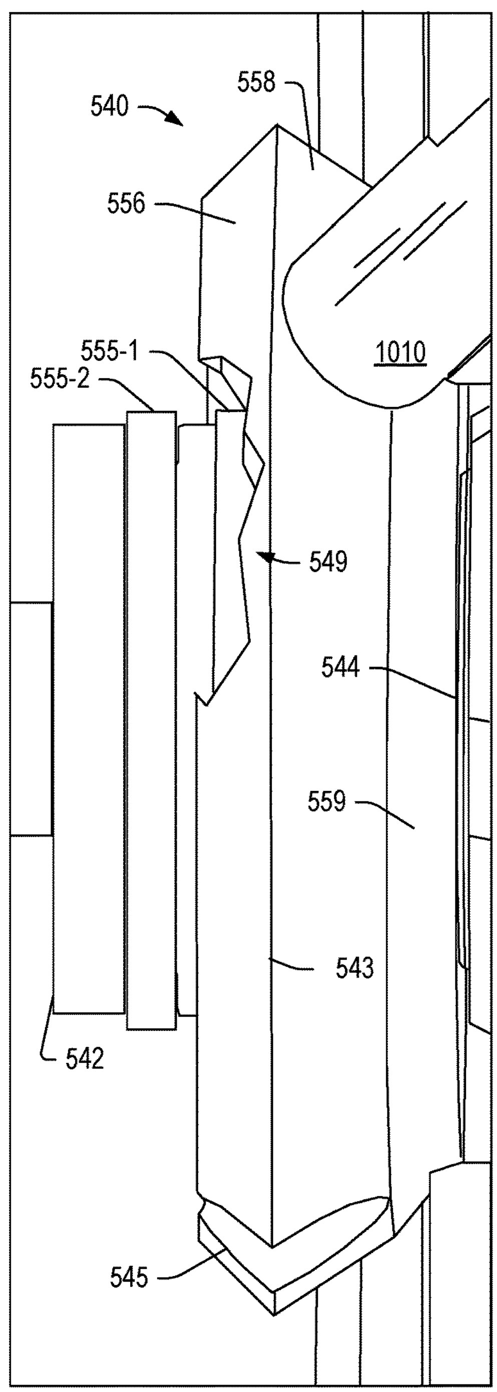
FIG. 11 is a perspective view of an example of the thrust collar of FIG. 10 that includes a balance cut.

FIG. 11 shows the thrust collar 540 as having material removed as part of a balancing process to thereby form a balance cut 549. Such a balance cut can be utilized to help balance a system such as, for example, the system 200 of FIG. 2.

As shown, the balance cut 549 is on the sacrificial portion 556 of the thrust collar 540, which does not interfere with the notches 545-1 and 545-2. FIG. 11 also shows the thrust collar 540 as including seal elements 555-1 and 555-2 seated in the annular grooves 547-1 and 547-2. In the example of FIG. 11, the compressor wheel side of the thrust collar 540 is on the left (shown without the backplate 242) while the sleeve side of the thrust collar 540 is on the right (see, e.g., FIG. 3). The sensor surface 558 is shown along with the surface 559 intermediate the sensor surface 558 and the end 544.

Referring to FIG. 3, the axial length of the rotating group including the compressor wheel 250 and the turbine wheel 270 is approximately four times the maximum diameter of the compressor wheel 250. For example, consider a maximum compressor wheel diameter of approximately 90 mm and an end-to-end length of a rotating group of approximately 370 mm. As an example, a long rotating group may be approximately three times the maximum diameter of a compressor wheel. As an example, an electric motor may have a length of approximately 100 mm. For example, in FIG. 3, the electric motor assembly 300 may be about 110 mm in length.

As an example, an electric motor can be rated with a power rating. For example, consider a power rating of approximately 5 kW to approximately 100 kW. As an example, the electric motor assembly 300 can have an electric motor rated at about 35 kW. As an example, the electric motor assembly 300 may be rated to achieve a maximum revolutions per minute of approximately 50,000 rpm or more, 100,000 rpm or more, etc. As an example, the electric motor assembly 300 may be rated to achieve more than 100,000 rpm during operation.

The overall axial length of the rotating group of the electric assist system 200 tends to be longer than that of a turbocharger with a center housing that is a bearing housing without an electric motor. As such, the longer axial length can make balancing, whether static or dynamic, more challenging when compared to a turbocharger without an electric motor disposed between a compressor wheel and a turbine wheel. The thrust collar 540 with its sacrificial portion 566 being positioned relatively close to the compressor wheel 250 can provide for balancing in addition to one or more other components that can provide for balancing of the rotating group of the system 200.

As to balancing, turbo machinery parts are balanced in an effort to keep the center of gravity along a rotating axis. When balancing the subassemblies of a rotating group, many of the components tend to be substantially cylindrical. Balancing can involve removal of material, for example, through a process such as grinding. Removing material that is radially close the rotating axis tends to have relatively little effect to correct balance. As explained above, the thrust collar 540 includes a sacrificial portion 556, which may be more than one portion, which provides a substantially triangular cross-section of material that is far enough away, radially, from the rotating axis to such that removal of material therefrom can effectuate an improvement in balance. Where a speed sensor is utilized, a sacrificial portion may be notched, which may form sacrificial portions (e.g., that span arc lengths). Where a speed sensor is utilized, a sacrificial portion or portions may be positioned to be away from a tip of the speed sensor.

As an example, a balancing process can include balancing a subassembly of a system such as the system 200. In such an example, subassembly unbalance may be calculated through a physical measurement. As an example, the thrust collar 540 can have material removed in a specified amount per calculations at a specified angle about a rotating axis. As an example, the thrust collar 540 may be cut before and/or after installation as part of a rotating group. For example, an unbalance measurement tool may measure unbalance and a calculation may be made (e.g., via hand and/or by computer, circuitry, etc.) that indicates an amount of material (e.g., a mass) to be removed from a sacrificial portion of a thrust collar. The material may then be removed from the sacrificial portion of the thrust collar and the thrust collar installed on a shaft between a shaft sleeve and a compressor wheel. The assembly may be measured again as to unbalance and further adjustments made, as desired. For example, one or more additional cuts may be made to a thrust collar and/or one or more other components.

As an example, a turbocharger, whether with electric motor assist or without electric motor assist, may be mounted with respect to an internal combustion engine where a shaft of the turbocharger is substantially horizontal or where the shaft of the turbocharger deviates from being substantially horizontal. For example, consider a turbocharger that is mounted where its shaft is at an angle of about plus or minus three degrees to about plus or minus 10 degrees from horizontal (e.g., 0 degrees, which may be defined with reference to gravity), where a turbine side may be down (plus) or up (minus). In such an example, the turbocharger may be mounted with a slope where gravity can affect mechanical and/or fluid behaviors. For example, as to mechanical behaviors, balance may be affected and, as to fluid behaviors, flow of lubricant may be affected.

As an example, consider a turbocharger that has a 5 degree slope, with respect to the rotating axis, with the turbine side down once installed in a vehicle. As mentioned, such a slope can affect balance and lubricant behaviors. Where the turbocharger is a long turbocharger (e.g., about three times to four times compressor wheel maximum diameter or more in axial length), such as for an electric motor assist turbocharger, an ability to balance subassemblies of a rotating group can be desirable.

As an example, a turbocharger can include a turbine side collar that includes a ramped portion that can help to sling lubricant to walls that define an interior chamber of a housing such that the lubricant can better collect at a lubricant drain. Such a turbine side collar can help to reduce an amount of lubricant that may otherwise have a tendency to escape into a turbine stage, for example, for a given installation slope. As mentioned, turbo machinery parts have to be balanced to keep the center of gravity along a rotating axis. When balancing the subassemblies of a rotating group, many components are cylindrical. To help balance, material can be removed, through a process such as, for example, grinding. Removing material that is radially close to the rotating axis tends to have relatively little effect to correct balance. As an example, a turbine side collar can provide material that is far enough away, radially, from the rotating axis such that removal of a portion of such material can make a balance improvement.

As mentioned, unbalance may be calculated and/or measured, for example, via an unbalance measurement tool (e.g., a machine, etc.). As an example, a turbine side collar can have material removed in a specified amount and, for example, at a particular angle about a longitudinal axis of the collar or without regard to angle. As an example, a cut turbine side collar may be installed in an angular orientation that allows at least a portion of the unbalance to be corrected. As an example, a balancing process or balancing processes may include cutting the compressor wheel 250 and/or the nut 258 and/or the thrust collar 540 and/or a turbine side balance collar (see, e.g., FIGS. 12, 13 and 14).

Figure 12:
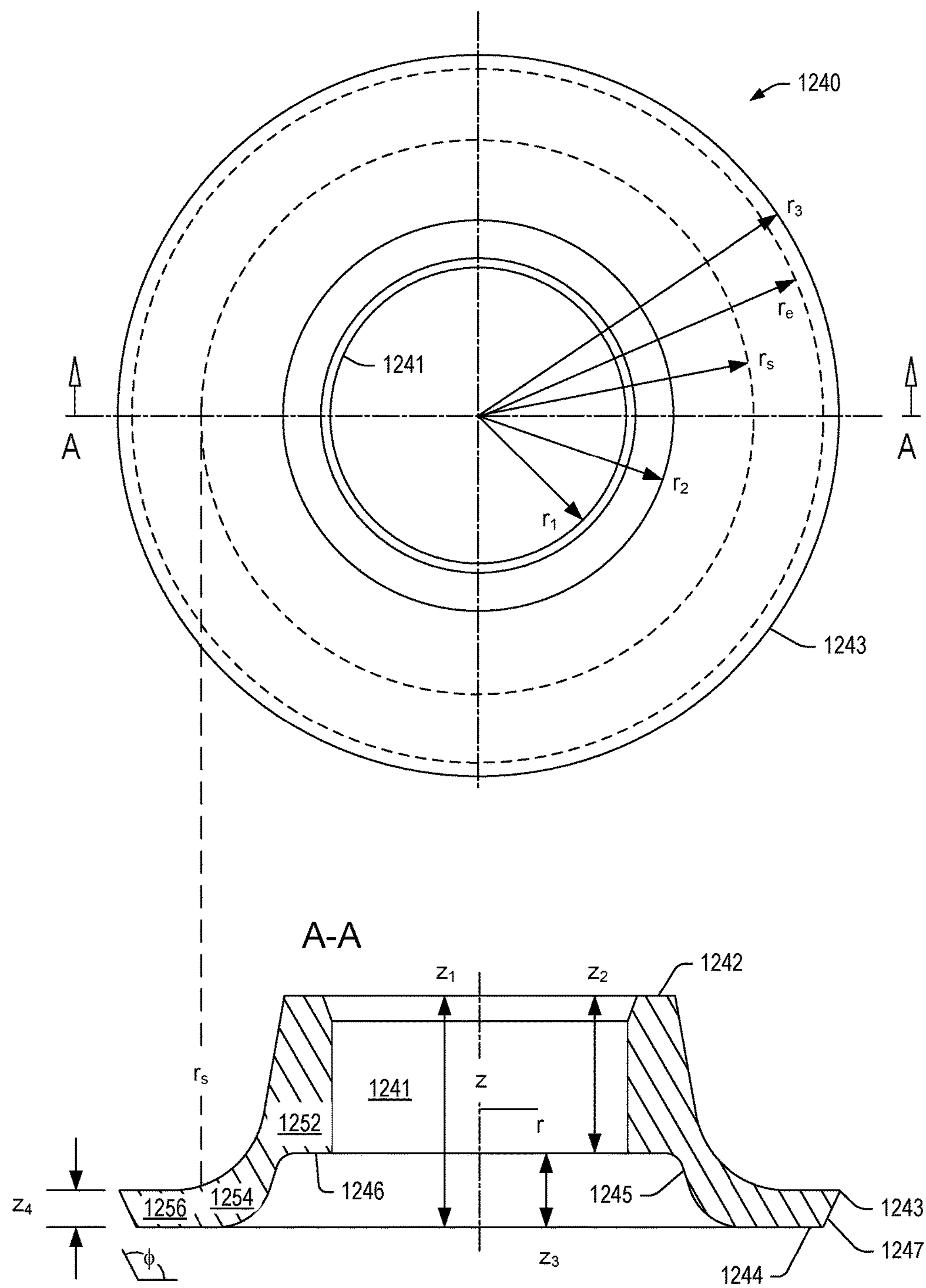
FIG. 12 is a series of views of an example of a collar.

FIG. 12 shows an example of a balance collar 1240 that may be utilized on a turbine side of the system 200. As shown, the balance collar 1240 includes a stepped bore 1241 that extends between opposing ends 1242 and 1244 where a shoulder contour 1245 has a flared shape that matches an exterior surface of the balance collar 1240. As shown, the balance collar 1240 includes a perimeter 1243, which is at a maximum diameter or maximum radius of the balance collar 1240. As shown, the balance collar 1240 can include a sloped annular end surface 1247 where the slope is radially inwardly over an axial distance from the perimeter 1243 toward the end 1244, which corresponds to a turbine end of the balance collar 1240 (e.g., the end 1242 may be a compressor end of the balance collar 1240 or an electric motor and/or electric generator end of the balance collar 1240). As shown in the example of FIG. 12, the sloped annular end surface 1247 extends from the perimeter 1243 at the radius $r_3$ to an edge at a radius $r_e$ over the axial distance $z_4$, which may define an angle $\phi$.

In the example of FIG. 12, the balance collar 1240 includes a stem portion 1252 and a flared portion 1254 that includes a sacrificial portion 1256.

FIG. 12 shows various dimensions as may be given with respect to a cylindrical coordinate system, including radii $r_1$, $r_2$, $r_3$ and axial lengths $z_1$, $z_2$, $z_3$ and $z_4$. As shown, the stepped bore 1241 includes a radius $r_1$ over an axial length of about $z_2$, noting that an annular chamfer can exist at an outer end of the bore 1241 at the end 1242. Over an axial length $z_3$, the stepped bore 1241 forms an annular axial face 1246 that can be substantially planar in an r,Θ-plane at an axial z position. The stepped bore 1241 then has the shoulder contour 1245 as a surface that extends to the end 1244.

As shown in the example of FIG. 12, the stem portion 1252 extends between the end 1242 and the annular axial face 1246 and may act as an axially locating portion of the balance collar 1240. For example, the stem portion 1252 may be part of an axial stack up of a rotating group where the balance collar 1240 rotates with the rotating group due to axial force applied to the stem portion 1252. As an example, the end 1242 may be in contact with the shaft sleeve 450 and the annular axial face 1246 may be in contact with another component such as a seal collar and/or a hub portion of a shaft (e.g., the hub portion 430 of the shaft 400).

The sacrificial portion 1256 can be a substantially annular ring portion that may be defined by an axial dimension $z_4$ between radii $r_s$ and $r_3$. The sacrificial portion 1256 may be cut to remove at least some of its material to effectuate a balance cut according to an unbalance measurement and/or unbalance calculation. As an example, a cut may be a straight cut that forms a flat, as may be defined by a chord of a circle. A chord of a circle is a straight line segment whose endpoints both lie on the circle. In such an example, the circle can be the perimeter 1243 of the balance collar 1240.

Figure 13:
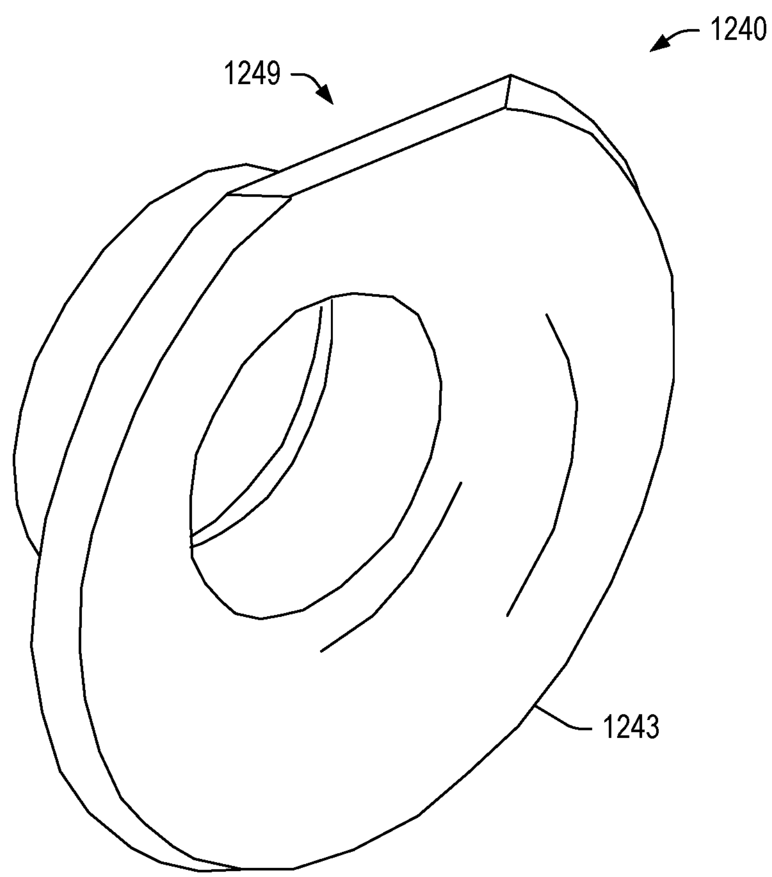
FIG. 13 is a perspective view of an example of the collar of FIG. 12 that includes a balance cut.

FIG. 13 shows the balance collar 1240 as including a balance cut 1249, which is shown approximately as a flat portion at the perimeter 1243, which may be defined at least in part by a chord of a circle. Such a balance cut can be utilized to help balance a system such as, for example, the system 200 of FIG. 2.

Figure 14:
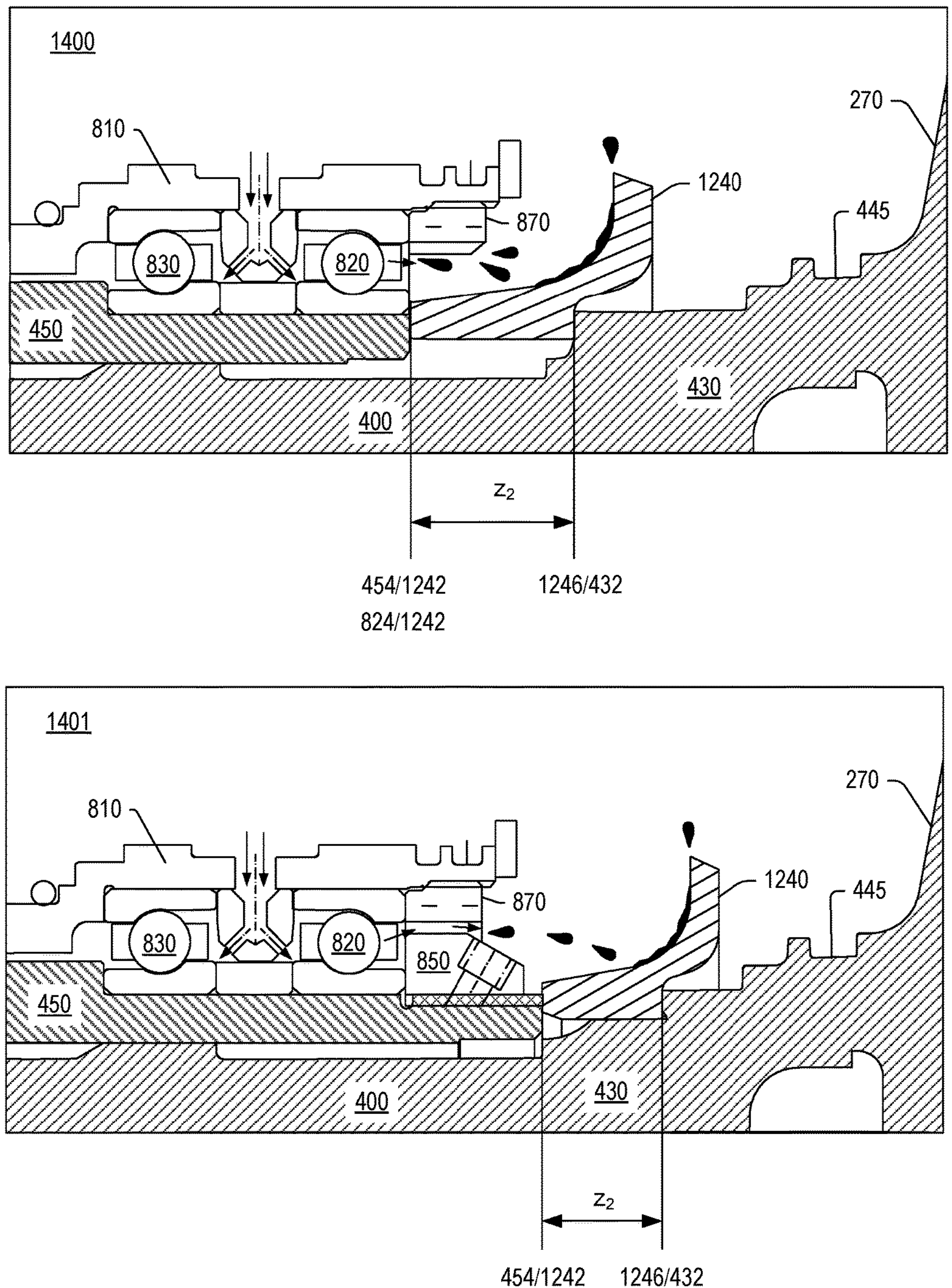
FIG. 14 is a cross-sectional view of a portion of a turbine side of a system.

FIG. 14 shows examples of a portion of a turbine side of a system 1400 and a system 1401 where each includes the shaft 400, the shaft sleeve 450, the turbine wheel 270, the cartridge 810, the bearing assemblies 820 and 830 and the outer lock nut 870 and where the system 1401 includes the lock nut 850.

As shown in the example system 1400 of FIG. 14, the balance collar 1240 can be positioned with the end 1242 against the end of the shaft sleeve 450 and the end of the inner race of the bearing assembly 820 and with the annular axial face 1246 of the balance collar 1240 against the surface 432 of the hub portion 430 of the shaft 400 where the hub portion 430 can include one or more annular grooves 445 that can seat one or more seal elements such as, for example, one or more piston rings, which may contact an inner bore surface of a housing and/or a plate (see, e.g., the plate 262 of the system 200 of FIG. 2). As shown, the balance collar 1240 is stacked with the rotating group over the axial length $z_2$. Thus, the balance collar 1240 may be utilized to axially locate an inner race of a bearing assembly, optionally without a lock nut such as the lock nut 850.

As shown in the example system 1401 of FIG. 14, the balance collar 1240 can be positioned between the end of the shaft sleeve 450 and the axial face surface 432 of the hub portion 430 of the shaft 400 where the hub portion 430 can include one or more annular grooves 445 that can seat one or more seal elements such as, for example, one or more piston rings, which may contact an inner bore surface of a housing and/or a plate (see, e.g., the plate 262 of the system 200 of FIG. 2). As shown, the balance collar 1240 is stacked with the rotating group over the axial length $z_2$ (see, e.g., FIG. 12).

As shown in the example system 1400 of FIG. 14, the hub portion 430 proximate to the end 454 of the shaft sleeve 450 is not in contact with the end 454 of the shaft sleeve 450, rather, axial force applied to the shaft sleeve 450 (e.g., via tightening of the nut 258 on to the shaft 400) is transferred to the hub portion 430 of the shaft 400, which is a shaft and turbine wheel assembly (SWA).

In the example system 1401 of FIG. 14, the end 454 of the shaft sleeve 450 is in contact with the end 1242 of the balance collar 1240 and the annular axial face 1246 of the balance collar 1240 is in contact with the axial face surface 432 of the hub portion 430 of the shaft 400, which is a shaft and turbine wheel assembly (SWA). As shown in the example system 1401 of FIG. 14, axial force applied to the shaft sleeve 450 (e.g., via tightening of the nut 258 on to the shaft 400) is transferred to the axial face surface 432 of the hub portion 430 of the shaft 400, which is shown as being attached to the turbine wheel 270.

FIG. 14 shows arrows that approximate directions of flow of lubricant to the bearing assemblies 820 and 830 where lubricant may flow axially outwardly between an annular gap or gaps between the lock nut 850 and the outer lock nut 870 toward the balance collar 1240. Lubricant can then contact the outer surface of the balance collar 1240 and migrate axially toward the turbine wheel 270 and radially outwardly toward the perimeter 1243 of the balance collar 1240, which may include one or more balance cuts. Lubricant can be flung substantially radially outwardly away from the balance collar 1240 as it rotates such that lubricant can more readily flow toward a lubricant exit with reduced risk of lubricant migrating toward the seal mechanism that acts to seal a turbine space with exhaust gas from a bearing space with lubricant.

As an example, a stem portion of a balance collar can bear a load. As an example, a larger diameter balance collar can have a larger effect on balance when cut. As an example, a cut can be a flat cut, which may help to avoid stress concentration when compared to, for example, a radial notch. As an example, a disc cutting tool may be utilized to cut a balance collar. As an example, a balance collar can be installed as part of a rotating group, imbalance measured, the balance collar marked, the balance collar removed, the balance collar cut and the balance collar installed at an appropriate alignment such that the balance collar as cut helps to balance the rotating group. As an example, a cutting process may cut a balance collar in situ where a tool can access the balance collar as part of a rotating group and where vacuum, a fluid stream, etc., may be utilized to help assure that debris does not interfere with the rotating group (e.g., bearing assemblies, etc.). As an example, where a lock nut is utilized, a balance collar may be shaped to allow for line of sight access to a set screw of a lock nut such that the set screw may be adjusted without having to remove the balance collar.

Figure 15:
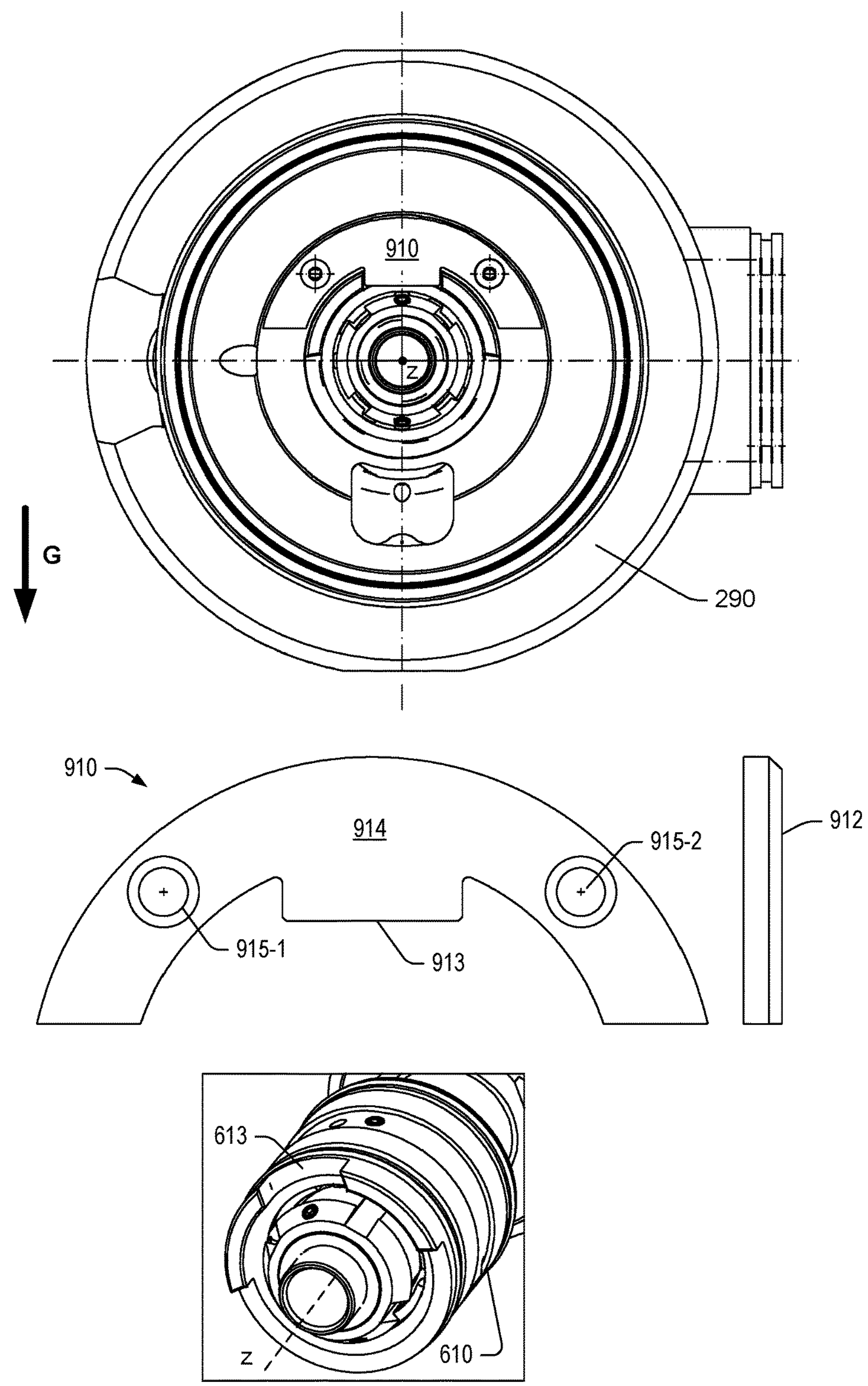
FIG. 15 is a series of views of examples of locating components.
Figure 16:
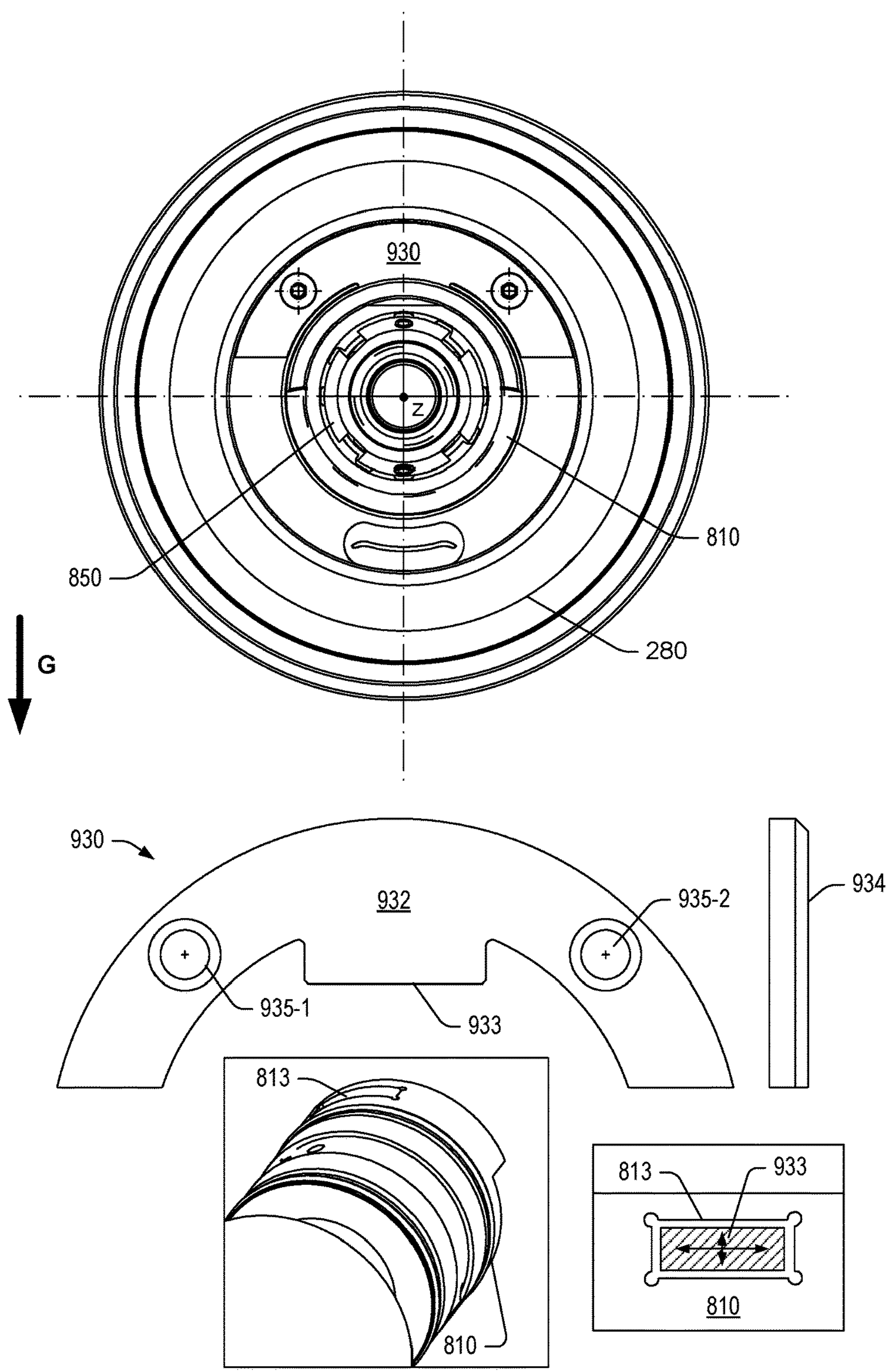
FIG. 16 is a series of views of examples of locating components.

FIGS. 15 and 16 show an example of the locating plate 910 with respect to the compressor side cartridge housing 290 along with a view of the recess 613 of the cartridge 610 and an example of the locating plate 930 with respect to the center housing 280 along with a view of the recess 813 of the cartridge 810. As shown, the locating plate 910 can include one or more openings 915-1 and 915-2 and the locating plate 930 can include one or more openings 935-1 and 935-2. Such opening or openings may be utilized to bolt the locating plate 910 or the locating plate 930 to a housing.

In FIGS. 15 and 16, an arrow is shown, labeled G, as representing an approximate direction of gravity (e.g., as the system 200 may be located and mounted in a vehicle's engine compartment). FIG. 15 shows a lubricant drain passage as being downwardly located with respect to gravity and FIG. 16 shows a lubricant drain passage as being downwardly located with respect to gravity.

The locating plate 910 and/or the locating plate 930 may be utilized in a system to provide for anti-rotation and/or axial retention. For example, such an approach may be utilized where a threaded pin in a bearing or plate on an end of a bearing cannot be used, which may be the case in some types of electric motor assist turbochargers.

As shown in FIG. 9, the locating plate 910 includes the extension 913 that extends radially inwardly and the locating plate 930 includes the extension 933 that extends radially inwardly.

As shown in FIGS. 15 and 16, an extension (e.g., a tooth or key) can extend from a plate to stop (e.g., limit) rotation of a cartridge that includes one or more bearing assemblies. As mentioned, when an extension is inserted into a closed recess (e.g., a closed slot), the extension can also stop (e.g., limit) axial movement.

As an example, a plate and a recess may be dimensioned to limit rotation about an axis to a limited number of degrees and may be dimensioned to limit axial movement to a limited distance.

As an example, a plate and a recess may allow for some amount of radial movement. For example, the extension 913 of the locating plate 910 can be received by the recess 613 of the cartridge 610 where some radial movement of the cartridge 610 may occur, for example, within limits that may be defined by the seal elements 663 and 665, which may be elastomeric seal elements that can deform to some extent (see also FIG. 4). Such deformation may be elastic deformation such that the elastomeric seal elements can return to an original shape. As an example, a rotating group can move radially within some amount of tolerance as may be determined by various seal elements.

As an example, the extension 933 of the locating plate 930 can be received by the recess 813 of the cartridge 810 where some radial movement of the cartridge 810 may occur, for example, within limits that may be defined by the seal elements 863 and 865, which may be elastomeric seal elements that can deform to some extent (see also FIG. 4). Such deformation may be elastic deformation such that the elastomeric seal elements can return to an original shape. As an example, a rotating group can move radially within some amount of tolerance as may be determined by various seal elements.

As an example, the recess 813 of the cartridge 810 can include flat portions and notched corners. FIG. 16 shows a plan view of the recess 813 with the extension 933 received therein where the recess 813 is rectangular shaped in the plan view (e.g., noting that the recess 813 is arced about the z-axis) where the corners of the recess 813 are notched, for example, via drilling. In such an example, corners of the extension 933 may be non-contact corners in that they cannot contact a surface of the cartridge 810 because the corners of the recess 813 are notched. For example, where the cartridge 810 moves azimuthally about the z-axis (e.g., in an angular direction Θ of a cylindrical coordinate system about the z-axis), a flat surface of the extension 933 (e.g., a side edge surface) and a flat surface of the recess 813 (e.g., a side wall surface) can contact as the corner notches provide space to receive the corners of the extension 933. Where movement occurs in an axial direction along the z-axis as to the cartridge 810, a flat surface of the extension 933 (e.g., a face surface) and a flat surface of the recess 813 (e.g., a facing wall surface) can contact as the corner notches provide space to receive the corners of the extension 933. As an example, the corner notches may be formed via drilling with a rotating drill bit and may be formed prior to cutting the recess 813 into the cartridge 810. In the example of FIG. 16, the corner notches may reduce stress and/or wear during operation of a system such as the system 200 of FIG. 2.

As an example, a system can include a plate as in FIG. 15 and/or a plate as in FIG. 16. As an example, a system can include a cartridge with a recess and without a plate with an extension. As an example, a system can include a compressor side bearing assembly in a compressor side cartridge and a turbine side bearing assembly in a turbine side cartridge. In such an example, a compressor side locating plate can be utilized to limit rotation and/or axial movement of the compressor side cartridge and/or a turbine side locating plate can be utilized to limit rotation and/or axial movement of the turbine side cartridge. In such an approach, radial movement of the compressor side cartridge and/or the turbine side cartridge may be allowed in a radial direction, which may be a direction substantially aligned with gravity. Such radial movement may be limited by one or more lubricant squeeze films and/or one or more elastomeric (e.g., spring or spring-like) members.

As an example, two plates may provide for limiting azimuthal rotation of two independent cartridges that include bores that receive ball bearing assemblies.

In such an example, the two plates may work cooperatively to limit axial movement of the two independent cartridges, one plate in one axial direction and the other plate in another, opposing axial direction. As shown in FIG. 16, a plate and a recess may act to limit axial movement of an assembly that includes a compressor side cartridge and a turbine side cartridge. As an example, a turbine side plate with an extension and a turbine side cartridge with a recess that receives the extension may be dimensioned to account for thermal effects (e.g., thermal expansion, etc.). As an example, as to a compressor side of a system, temperature and temperature range may be less than at a turbine side of the system, particularly where an electric motor assembly may be disposed between the turbine side and the compressor side of the system.

As an example, a system may be a fuel cell system that includes two compressor wheels that can be disposed on a common shaft, which may be a unitary shaft or a shaft assembly. Such an approach can include a motor driven by the fuel cell. As an example, one or more features described herein may be included in a fuel cell system that includes one or more compressor wheels.

As an example, a cartridge may be made of steel. For example, the cartridge 610 and/or the cartridge 810 may be made of steel. As an example, a plate or plates may be made of steel. For example, the plate 910 and the plate 930 may be made of steel. As an example, a component may be made of a metal, a metal alloy or another type of material. As an example, materials of construction may be selected based in part on operational temperature or temperatures. As an example, the sleeve 450 may be a unitary piece or may be a multi-piece sleeve.

A turbocharger assembly can include a shaft sleeve that includes a bore that extends between a compressor end and a turbine end, outer threads that extend to a first axial position from the compressor end, and an outer shoulder at a second, greater axial position from the compressor end; a lock nut that includes inner threads that mate with the outer threads of the shaft sleeve and an axial length that is less than a distance between the compressor end and the first axial position; and a bearing assembly that includes at least one inner race axially located by the outer shoulder of the shaft sleeve and axially located by the lock nut.

As an example, a lock nut can include a set screw that is rotatable to contact the outer threads of a shaft sleeve. As an example, a bearing assembly can include a first inner race, a second inner race and an inner ring disposed axially between the first inner race and the second inner race.

As an example, a turbocharger assembly can include a shaft received in a bore of a shaft sleeve, which can be a through bore that extend from one end of the shaft sleeve to an opposing end of the shaft sleeve. In such an example, the turbocharger assembly can include a thrust collar and a compressor wheel disposed on the shaft where the thrust collar is disposed between the compressor wheel and the shaft sleeve. In such an example, the thrust collar is located by another outer shoulder of the shaft sleeve where, for example, an axial clearance can exist between the lock nut and the thrust collar such that the thrust collar does not contact the lock nut. Such an approach can allow for locating a bearing assembly without the bearing assembly carrying an axial load associated with fitting a compressor wheel where a fitting load may be carried by the thrust collar and the shaft sleeve, which may contact a hub portion of a shaft at or near, for example, a turbine end of the shaft sleeve.

As an example, an assembly can include a cartridge that includes a bore where a bearing assembly is received in the bore of the cartridge. In such an example, the assembly can include an outer lock nut that includes outer threads where the bore of the cartridge includes inner threads that mate with the outer threads of the outer lock nut. In such an example, the outer lock nut can have an axial length that is less than the axial length of another lock nut, which can be an inner lock nut that threads onto a sleeve to axially locate a bearing assembly received in the bore of the cartridge.

As an example, a bearing assembly or bearing assemblies can include at least one angular contact ball bearing. As an example, two rolling element bearing assemblies, each with an inner race, an outer race and rolling elements disposed between the inner and outer races, can be oriented in one or more configurations. For example, consider an O-type configuration or an X-type configuration.

As an example, an assembly can include a shaft sleeve that includes an electric motor rotor. Such an assembly may be a compressor assembly, a dual-compressor wheel assembly, a turbine assembly (e.g., with a generator rotor), a turbocharger assembly, etc. As an example, an assembly may be an electric turbocharger that can operate via electrical power and/or exhaust gas from an internal combustion engine. As an example, an electric motor stator can be included in an assembly that drives an electric motor rotor.

As an example, an assembly can include a shaft received by a shaft sleeve where the shaft includes a hub portion and where a turbine end of the shaft sleeve contacts the hub portion. In such an example, the assembly can include a compressor wheel disposed on the shaft, a thrust collar disposed on the shaft and a nut disposed on the shaft where the nut applies a load to the compressor wheel, the thrust collar and the shaft sleeve between the nut and the hub portion of the shaft. In such an example, a bearing assembly that rotatably supports a rotating group that includes the compressor wheel, the nut, the thrust collar, the shaft and the shaft sleeve can be independent of the applied load to the compressor wheel, the thrust collar and the shaft sleeve between the nut and the hub portion of the shaft. In such an approach, a race (e.g., an inner race or an outer race) of a bearing assembly can be designed, dimensioned, made of a material of construction, etc., that does not need to account for the applied load to the compressor wheel. As an example, a bearing assembly may be loaded independent of an applied load to a compressor wheel. As an example, a bearing assembly may be axially located in a manner that does not depend on a surface or surfaces of a component or components that experience an applied load to a compressor wheel.

As an example, a compressor assembly can include a shaft sleeve that includes a bore that extends between a first end and a second end and an outer shoulder; a shaft received by the bore of the shaft sleeve where the shaft includes a compressor end; a compressor wheel disposed on the shaft; and a thrust collar disposed on the shaft and seated between the outer shoulder of the shaft sleeve and the compressor wheel where the thrust collar includes a stem portion and a cap portion that includes a sacrificial portion. In such an example, the sacrificial portion of the thrust collar can include at least one balance cut. A balance cut can be a deviation in a profile of a sacrificial portion. For example, a sacrificial portion can be formed to have a profile that is relatively consistent about an azimuthal span or spans about a longitudinal axis of a thrust collar that includes the sacrificial portion. A balance cut can be formed via a tool or tools. For example, a drilling tool or cutting tool may be utilized to remove material from a sacrificial portion such that the profile of the sacrificial portion bears indicia of material removal. When a thrust collar is considered as part of a rotating group, the shape of the thrust collar, particularly as to the sacrificial portion including at least one balance cut, is a shape that can enhance balance of the rotating group.

As an example, a cap portion of a thrust collar can include a sensor notch or sensor notches. In such an example, a sensor notch may extend through A sacrificial portion of the thrust collar.

As an example, a thrust collar can include an annular groove about an exterior of a stem portion.

As an example, a sacrificial portion of a thrust collar can include a triangular cross-sectional shape (e.g., as part of a profile or to define a profile of the sacrificial portion). As an example, a sacrificial portion can extend to an outermost perimeter of a thrust collar. In such an example, a vertex of a triangular cross-sectional shape may be at the outermost perimeter of the thrust collar. As an example, a sacrificial portion can extend axially to an apex, which may be, for example, a vertex of a triangular cross-sectional shape of the sacrificial portion.

As an example, an assembly can include a thrust collar that includes a plane disposed at an axial position where a sacrificial portion of the thrust collar is disposed axially to one side of the plane. In such an example, the sacrificial portion can be disposed axially to the side of the plane that is toward a compressor end of the shaft.

As an example, a balance cut in a sacrificial portion of a thrust collar can be inset radially from an outermost perimeter of a cap portion of the thrust collar.

As an example, a compressor assembly can include a speed sensor. As an example, a compressor assembly can include a shaft sleeve that is operatively coupled to a rotor of an electric motor. In such an example, a stator may be energized to cause the rotor to rotate and, for example, rotate a compressor wheel disposed in a compressor housing that includes a diffuser section and a volute with an opening for compressed air (e.g., air, air and exhaust, etc.).

As an example, a method can include measuring unbalance of a rotating group of a turbocharger; and, based at least in part on the unbalance, removing an amount of material from a sacrificial portion of a thrust collar. In such an example, the thrust collar can include a stem portion with a through bore and a cap portion where the sacrificial portion extends from the cap portion. As an example, the aforementioned method can include rotating the rotating group via an electric motor operatively coupled to the turbocharger (e.g., energizing an electric motor to rotate the rotating group via an electric motor rotor fit to a shaft of the turbocharger). As an example, a turbocharger can include an electric motor where the electric motor is disposed between a compressor wheel and a turbine wheel of the turbocharger.

As an example, a turbocharger assembly can include a shaft sleeve that includes a bore that extends between a first end and a second end; a shaft received by the bore of the shaft sleeve where the shaft includes a compressor end and a turbine wheel that defines a turbine end; and a balance collar disposed on the shaft and seated axially between the end of the shaft sleeve and the turbine wheel where the balance collar includes a stem portion and a flared portion that includes a sacrificial portion. In such an example, the sacrificial portion of the balance collar can include at least one balance cut. A balance cut can be a deviation in a profile of a sacrificial portion. For example, a sacrificial portion can be formed to have a profile that is relatively consistent about an azimuthal span or spans about a longitudinal axis of a balance collar that includes the sacrificial portion. A balance cut can be formed via a tool or tools. For example, a drilling tool or cutting tool may be utilized to remove material from a sacrificial portion such that the profile of the sacrificial portion bears indicia of material removal. When a balance collar is considered as part of a rotating group, the shape of the balance collar, particularly as to the sacrificial portion including at least one balance cut, is a shape that can enhance balance of the rotating group.

As an example, a balance collar can include a balance cut defined at least in part by a chord of a circle where the circle has a radius defined by an outermost perimeter of the balance collar. In such an example, a cutting tool, which may be a rotating disk cutting tool, may remove a portion of the balance collar to form the balance cut.

As an example, a balance collar can include a stepped bore that includes an annular axial face. In such an example, an axial face surface of a hub portion of a shaft can be utilized to seat against the annular axial face. As an example, a balance collar can be loaded between an end of a component and a hub portion of a shaft. As an example, in a turbocharger assembly, a balance collar can be loaded by an axial load between an end of a shaft sleeve and an axial face surface of a hub portion of a shaft that is disposed at least in part in a bore of the shaft sleeve. In such an example, the shaft can have a turbine wheel welded thereto and can have a compressor wheel fit thereto. For example, consider a compressor wheel with a through bore where a portion of the shaft is received by the through bore of the compressor wheel and where a nut may be threaded onto threads of the shaft to apply a load to the compressor wheel, which may be, for example, carried by the shaft sleeve and the hub portion of the shaft with one or more components disposed along an axial stack-up chain.

As an example, a sacrificial portion of a balance collar can be disposed over an axial length of the balance collar that does not overlap axially with a stem portion of the balance collar. For example, a stem portion of a balance collar can be axially offset from a sacrificial portion of the balance collar. Such an approach may help to decouple stress(es) experienced by the sacrificial portion from effecting the stem portion, which may, for example, carry an axial load (e.g., as part of an axial stack-up chain of a rotating group).

As an example, a sacrificial portion of a balance collar can be disposed at a radial distance greater than an outermost radius of a stem portion of the balance collar. As an example, a sacrificial portion of a balance collar can include a sloped annular end surface, which may be shape to sling lubricant (e.g., oil, etc.) while the balance collar is rotating about a longitudinal axis in unison with a rotating group.

As an example, a turbocharger assembly can include a balance collar and a shaft sleeve that is operatively coupled to a rotor of an electric motor. In such an example, the balance collar can include a balance cut or cuts that enhance the balance of the turbocharger, as driven by the electric motor and/or by exhaust gas that flows through a turbine housing to rotatably drive a turbine wheel.

As an example, a method can include measuring unbalance of a rotating group of a turbocharger; and, based at least in part on the unbalance, removing an amount of material from a sacrificial portion of a turbine side balance collar. In such an example, the balance collar can include a stem portion with a through bore where the sacrificial portion is axially offset from the stem portion. For example, a balance collar can have an axial length where the stem portion has an axial length over an axial span and where the sacrificial portion has an axial length over an axial span where the axial spans do not overlap axially. In such an example, the balance collar can include a stepped through bore where an annular face within the stepped through bore can be utilized to seat a component where a load may be transferred from the balance collar to the component. In such an example, a shaft sleeve may apply a load to the balance collar and the balance collar may transfer that load to the component, which may be a hub portion of a shaft that is received at least in part by a through bore of the shaft sleeve.

As an example, a method can include rotating a rotating group via an electric motor operatively coupled to a turbocharger as part of a balancing process. In such an example, the turbocharger can include the electric motor where the electric motor is disposed between a compressor wheel and a turbine wheel of the turbocharger.

As an example, a system can include a housing that includes a bore having a longitudinal axis; a cartridge disposed in the bore where the cartridge includes a recess; a bearing assembly disposed in the cartridge where the bearing assembly includes an outer race and rolling elements; and a locating plate attached to the housing where the locating plate includes an extension that is received by the recess of the cartridge. In such an example, the cartridge can include the recess as a keyway and the locating plate can include the extension as a key where the key can be received at least in part by the keyway.

As an example, a cartridge can be a compressor side cartridge where a recess is an open recess and where an extension of a locating plate limits rotation of the cartridge about a longitudinal axis. In such an example, an open recess can be a recess with an open side, for example, it can be a three-sided recess where an open side is an axial side.

As an example, a cartridge can be a turbine side cartridge where a recess includes a closed recess where an extension of a locating plate limits rotation of the cartridge about a longitudinal axis and limits axial movement of the cartridge along the longitudinal axis. In such an example, a closed recess can be a recess without an open side, for example, it can be a four sided recess. As an example, such a recess may include one or more notched corners such that one or more corners of the extension of the locating plate does not or do not directly contact a wall of the recess (e.g., material of the cartridge). Such an approach can reduce wear as to the extension and/or the cartridge.

As an example, a recess can be a keyway and an extension can be a key. As an example, a system can include a key and keyway pair or pairs. As an example, a cartridge may include a key and another component may include a keyway (e.g., a housing, a component attached to a housing, etc.).

As an example, an extension can be received by a recess of a cartridge in a manner that allows for radial movement of the cartridge with respect to the longitudinal axis. In such an example, the radial movement may be in a direction that is substantially aligned with gravity (e.g., as a system may be mounted in a vehicle that is flat on a horizontal surface).

As an example, a system can include a seal element disposed between a cartridge and a bore of a housing. In such an example, deformation of the seal element can provide for radial movement of the cartridge with respect to a longitudinal axis of the bore of the housing. As an example, a seal element can be an elastomeric seal element, which may be at least in part elastomeric (e.g., consider a composite element).

As an example, a cartridge can include a lubricant inlet where, for example, seal elements disposed between a bore of a housing and the cartridge can define a lubricant space where the lubricant inlet is disposed axially between the seal elements.

As an example, a system can include an electric motor. As an example, a system may be a compressor system, a turbine system, a turbocharger system, etc. As an example, a system can include one or more compressors (e.g., consider a system with a compressor at one end, an electric motor and another compressor at another end).

As an example, a system can include a shaft sleeve where a bearing assembly is mounted to the shaft sleeve and where the bearing assembly is disposed at least in part in a bore of a cartridge, which may be located axially and/or azimuthally by a key and keyway pair. In such an example, the system can include an electric motor rotor that is mounted to the shaft sleeve.

As an example, a system can include a housing assembly that includes a compressor side bore and a turbine side bore having a common longitudinal axis; a compressor side cartridge disposed in the compressor side bore where the compressor side cartridge includes a recess; a compressor side locating plate attached to the housing assembly where the compressor side locating plate includes an extension that is received by the recess of the compressor side cartridge; a turbine side cartridge disposed in the turbine side bore where the turbine side cartridge includes a recess; and a turbine side locating plate attached to the housing assembly where the turbine side locating plate includes an extension that is received by the recess of the turbine side cartridge. In such an example, the recess of the compressor side cartridge can be an open recess and the extension of the compressor side locating plate can limit rotation of the compressor side cartridge about the longitudinal axis and/or the recess of the turbine side cartridge can be a closed recess where the extension of the turbine side locating plate limits rotation of the turbine side cartridge about the longitudinal axis and limits axial movement of the turbine side cartridge along the longitudinal axis and, optionally where, the limitation of axial movement of the turbine side cartridge along the longitudinal axis also limits axial movement of the compressor side cartridge along the longitudinal axis.

As an example, a system can include extensions received by recesses of cartridges that allow for radial movement of cartridges with respect to a longitudinal axis of a rotating group of the system.

As an example, a system can include an electric motor. As an example, an electric motor can include a rotor operatively coupled to a shaft, optionally via a shaft sleeve. Such a system can include a compressor, compressors, a turbine, turbines, etc.

As an example, a system can include a shaft sleeve, a compressor side bearing assembly disposed in a compressor side cartridge and mounted to the shaft sleeve and a turbine side bearing assembly disposed in a turbine side cartridge and mounted to the shaft sleeve. In such an example, the system can include an electric motor rotor that is mounted to the shaft sleeve.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A system comprising:

a housing assembly that comprises a compressor side bore and a turbine side bore having a common longitudinal axis;

a compressor side cartridge disposed in the compressor side bore wherein the compressor side cartridge comprises an open recess that is open axially in an axial direction away from an axial side and that defines an azimuthal angle between two azimuthal sides;

a compressor side locating plate attached to the housing assembly wherein the compressor side locating plate comprises an extension that is received by the open recess of the compressor side cartridge to limit rotation of the compressor side cartridge about the longitudinal axis;

a turbine side cartridge disposed in the turbine side bore wherein the turbine side cartridge comprises a closed recess that is closed axially at opposing axial sides and that defines an azimuthal angle between two azimuthal sides;

a turbine side locating plate attached to the housing assembly wherein the turbine side locating plate comprises an extension that is received by the closed recess of the turbine side cartridge to limit rotation of the turbine side cartridge about the longitudinal axis and to limit axial movement of the turbine side cartridge along the longitudinal axis;

a shaft sleeve;

a compressor side bearing assembly disposed in the compressor side cartridge and mounted to the shaft sleeve; and a turbine side bearing assembly disposed in the turbine side cartridge and mounted to the shaft sleeve, wherein the limitation of axial movement of the turbine side cartridge along the longitudinal axis by the turbine side locating plate limits axial movement of the compressor side cartridge along the longitudinal axis.

2. The system of claim 1 comprising an electric motor.

3. The system of claim 1 wherein an electric motor rotor is mounted to the shaft sleeve.

4. The system of claim 1 wherein the extensions received by the recesses allow for radial movement of the cartridges with respect to the longitudinal axis and wherein, for the system mounted in a vehicle that is flat on a horizontal surface, the allowed radial movement is in a direction that is substantially aligned with gravity.

5. The system of claim 1 comprising a seal element disposed between the compressor side cartridge and the compressor side bore.

6. The system of claim 5 wherein deformation of the seal element provides for radial movement of the compressor side cartridge with respect to the longitudinal axis.

7. The system of claim 5 wherein the seal element comprises an elastomeric seal element.

8. The system of claim 1 comprising a seal element disposed between the turbine side cartridge and the turbine side bore.

9. The system of claim 8 wherein deformation of the seal element provides for radial movement of the turbine side cartridge with respect to the longitudinal axis.

10. The system of claim 8 wherein the seal element comprises an elastomeric seal element.

11. The system of claim 1 wherein the compressor side cartridge comprises a lubricant inlet and comprising seal elements disposed between the compressor side bore and the compressor side cartridge wherein the lubricant inlet is disposed axially between the seal elements.

12. The system of claim 1 wherein the turbine side cartridge comprises a lubricant inlet and comprising seal elements disposed between the turbine side bore and the turbine side cartridge wherein the lubricant inlet is disposed axially between the seal elements.

13. The system of claim 1 wherein the compressor side bearing assembly is mounted to the shaft sleeve by a nut that is configured to prevent axial displacement with respect to the shaft sleeve; and wherein the turbine side bearing assembly is mounted to the shaft sleeve by a nut that is configured to prevent axial displacement with respect to the shaft sleeve.

14. The system of claim 1 wherein the extensions received by the recesses allow for radial movement of the cartridges with respect to the longitudinal axis.

15. The system of claim 1 wherein the compressor side cartridge and the turbine side cartridge are independently rotatable about the longitudinal axis and limited rotationally by the open recess and the compressor side locating plate and the closed recess and the turbine side locating plate, respectively.

* * * * *